(12) United States Patent
Chang et al.

(10) Patent No.: US 9,098,147 B2
(45) Date of Patent: Aug. 4, 2015

(54) RANGING APPARATUS, RANGING METHOD, AND INTERACTIVE DISPLAY SYSTEM

(71) Applicant: Industrial Technology Research Institute, Hsinchu (TW)

(72) Inventors: Chuan-Chung Chang, Hsinchu County (TW); Chy-Lin Wang, Taipei (TW); Yung-Lin Chen, Yunlin County (TW); Chir-Weei Chang, Taoyuan County (TW); Kuo-Tung Tiao, Hsinchu County (TW); Hsien-Chang Lin, Taipei (TW); Chia-Chen Chen, Hsinchu (TW); Wei-Jia Huang, Nantou County (TW)

(73) Assignee: Industrial Technology Research Institute, Hsinchu (TW)

( * ) Notice: Subject to any disclaimer, the term of this patent is extended or adjusted under 35 U.S.C. 154(b) by 157 days.

(21) Appl. No.: 13/653,418

(22) Filed: Oct. 17, 2012

(65) Prior Publication Data

US 2013/0169595 A1 Jul. 4, 2013

Related U.S. Application Data

(60) Provisional application No. 61/581,098, filed on Dec. 29, 2011.

(30) Foreign Application Priority Data

Jun. 8, 2012 (TW) ............................. 101120697 A

(51) Int. Cl.
*G06F 3/042* (2006.01)
*G06K 9/00* (2006.01)
*H04N 7/18* (2006.01)

(52) U.S. Cl.
CPC ................ *G06F 3/0425* (2013.01); *G06K 9/00* (2013.01); *G06F 2203/04101* (2013.01); *H04N 7/18* (2013.01)

(58) Field of Classification Search
CPC .................... G06F 3/0425; G06F 2203/04101; H04N 7/18; H04N 7/181; H04N 7/183; H04N 7/185; H04N 7/186; H04N 7/188; G06K 9/00
See application file for complete search history.

(56) References Cited

U.S. PATENT DOCUMENTS

| 4,123,650 A | 10/1978 | Hosoe et al. |
| 4,913,546 A | 4/1990 | Nagaoka et al. |

(Continued)

FOREIGN PATENT DOCUMENTS

| CN | 1263282 | 8/2000 |
| CN | 101144959 | 3/2008 |

(Continued)

OTHER PUBLICATIONS

"Office Action of Taiwan Counterpart Application", issued on Feb. 19, 2014, p. 1-p. 9.

(Continued)

*Primary Examiner* — Johnathan Boyd
*Assistant Examiner* — Sardis Azongha
(74) *Attorney, Agent, or Firm* — Jianq Chyun IP Office

(57) ABSTRACT

A ranging apparatus including an image sensor, an imaging lens, and a processor is provided. The imaging lens is configured to image an object on the image sensor to produce an image signal having at least one image parameter, wherein the at least one image parameter changes with a change of an object distance of the object. The processor is configured to determine the change of the object distance according to a change of the at least one image parameter. A ranging method and an interactive display system are also provided.

39 Claims, 21 Drawing Sheets

(56) References Cited

U.S. PATENT DOCUMENTS

| | | | |
|---|---|---|---|
| 5,001,508 A | 3/1991 | Ogawa | |
| 6,587,183 B1 | 7/2003 | Uomori et al. | |
| 6,747,666 B2* | 6/2004 | Utterback et al. | 345/629 |
| 7,078,720 B2 | 7/2006 | Yamaguchi | |
| 8,373,751 B2* | 2/2013 | Han et al. | 348/140 |
| 2006/0197756 A1 | 9/2006 | Sun | 345/179 |
| 2007/0119942 A1 | 5/2007 | Barsotti et al. | |
| 2009/0141163 A1* | 6/2009 | Attar et al. | 348/345 |
| 2009/0147124 A1* | 6/2009 | Taniyama et al. | 348/335 |
| 2009/0147999 A1* | 6/2009 | Maeda et al. | 382/106 |
| 2009/0273719 A1* | 11/2009 | Kuwata et al. | 348/745 |
| 2010/0110445 A1 | 5/2010 | Ditto | |
| 2010/0290120 A1 | 11/2010 | Ditto et al. | |
| 2010/0315541 A1* | 12/2010 | Egawa | 348/294 |
| 2011/0025845 A1 | 2/2011 | Han et al. | |
| 2011/0187678 A1* | 8/2011 | Salaverry et al. | 345/175 |
| 2011/0222734 A1* | 9/2011 | Angot et al. | 382/106 |
| 2011/0267508 A1* | 11/2011 | Kane et al. | 348/241 |
| 2012/0182448 A1* | 7/2012 | Cohen et al. | 348/231.99 |

FOREIGN PATENT DOCUMENTS

| | | |
|---|---|---|
| CN | 101232578 | 7/2008 |
| CN | 101243458 | 8/2008 |
| CN | 101986243 | 3/2011 |
| TW | 385362 | 3/2000 |
| TW | 476000 | 2/2002 |
| TW | 482939 | 4/2002 |
| TW | 523635 | 3/2003 |
| TW | I250793 | 3/2006 |
| TW | I257072 | 6/2006 |
| TW | 200907530 | 2/2009 |
| TW | 201000953 | 1/2010 |
| TW | 201031895 | 9/2010 |
| TW | 201031988 | 9/2010 |
| TW | 201131512 | 9/2011 |

OTHER PUBLICATIONS

Yun-Chung Chung, et al., "An Edge Analysis Based Blur Measure for Image Processing Applications", Journal of Taiwan Normal University: Mathematics, Science & Technology, vol. 51, No. 1, 2006, pp. 21-31.

Dowski, Jr. et al., "Single-lens single-image incoherent passive-ranging systems," Applied Optics 33(29), Oct. 10, 1994, pp. 6762-6773.

Chen et al., "Single shot depth camera lens design optimization based on a blur metric," Proc. of SPIE, vol. 7787, 2010, pp. 77870A-1-77870A-9.

Dowski, Jr. et al., "Wavefront Coding for Detection and Estimation With a Single-Lens Incoherent Optical System," International Conference on Acoustics, Speech, and Signal Processing (ICASSP), 1995, pp. 2451-2454.

Greengard et al., "Depth from diffracted rotation," Optics Letters 31(2), Jan. 15, 2006, pp. 181-183.

Chang et al., "Depth perception with a rotationally symmetric coded camera," Proc. of SPIE, vol. 7429, 2009, pp. 742905-1-742905-9.

Ghosh et al., "Effect of double-helix point-spread functions on 3D imaging in the presence of spherical aberrations," Proc. of SPIE, vol. 7904, 2011, pp. 79041D-1-79041D-9.

Tisse et al., "Extended depth-of-field (EDoF) using sharpness transport across colour channels," Proc. of SPIE, vol. 7061, 2008, pp. 706105-1-706105-12.

Guichard et al., "Extended depth-of-field using sharpness transport across color channels," Proc. of SPIE-IS&T, vol. 7250, 2009, pp. 72500N-1-72500N-12.

Simonov et al., "Passive ranging and three-dimensional imaging through chiral phase coding," Optics Letters 36(2), Jan. 15, 2011, pp. 115-117.

Johnson et al., "Passive ranging through wave-front coding: information and application," Applied Optics 39(11), Apr. 10, 2000, pp. 1700-1710.

Hu et al., "Low Cost Robust Blur Estimator," IEEE International Conference on Image Processing, 2006, pp. 617-620.

Ciancio et al., "Objective no-reference image blur metric based on local phase coherence," Electronics Letters 45(23), Nov. 5, 2009, pp. 1162-1163.

Han et al., "Novel no-reference image blur metric based on block-based discrete cosine transform statistics," Optical Engineering (OE) Letters 49(5), May 2010, pp. 050501-1-050501-3.

Aditya Anchuri, "Image Blur Metrics," Stanford University, MS 2011, Ref: Dr. Joyce Farrell Psych 221, pp. 1-8.

Liang et al., "A No-Reference Perceptual Blur Metric Using Histogram of Gradient Profile Sharpness," 2009 IEEE International Conference on Image Processing (ICIP), 2009, pp. 4369-4372.

Narvekar et al., "A No-Reference Image Blur Metric Based on the Cumulative Probability of Blur Detection (CPBD)," IEEE Transactions on Image Processing 20(9), Sep. 2011, pp. 2678-2683.

Marziliano et al., "A No-Reference Perceptual Blur Metric," 2002 IEEE International Conference on Image Processing (ICIP), 2002, pp. III-57-III-60.

"Office Action of China Counterpart Application", issued on Mar. 5, 2015, p. 1-p. 4.

"Office Action of China Counterpart Application" , issued on Nov. 15, 2014, p. 1-p. 9.

* cited by examiner

28cm   30cm   32cm

RANGING APPARATUS, RANGING METHOD, AND INTERACTIVE DISPLAY SYSTEM

CROSS-REFERENCE TO RELATED APPLICATION

This application claims the priority benefits of U.S. provisional application Ser. No. 61/581,098, filed on Dec. 29, 2011 and Taiwan application serial no. 101120697, filed on Jun. 8, 2012. The entirety of each of the above-mentioned patent applications is hereby incorporated by reference herein and made a part of this specification.

TECHNICAL FIELD

The disclosure is related to a measuring apparatus, a measuring method, and a display system, and more particularly to a ranging apparatus, a ranging method, and an interactive display system.

BACKGROUND

In today's touch control technology, taking tablet computers or smart phones as examples, controls are initiated through touching or sliding operations on a panel of an apparatus through one or multiple user's fingertip or pen like object which is held by the user. Alternatively, in addition to the touch panels, two or more camera lenses can be utilized to obtain the relative distances of the objects within a scene though a parallax method. However, if a distance detecting function with high accuracy is to be obtained under a short distance, taking double camera lens as example, the resolution of the distance recognition is positively correlated with the distance between the camera lenses, so that it increases the difficulty of reducing the volume of the whole system.

Furthermore, an additional detection light may be emitted onto the scene that is to be measured, and distances may be determined through the time-of-flight method or the variations of the projected structured light. By using the time-of-flight method as example, an electrical circuit for processing the high frequency signal is required to determine the distance of an object at close range due to the high speed characteristic of the speed of light. Furthermore, additional light and projecting apparatus are required in the method of projecting structured light. Hence, it is more difficult to meet the requirements of low energy consumption and system volume reduction. Although an effect of human and machine interaction is achieved through the variations of the position of the reflected light after the scanning of the scene with additional light source. However, the same problem exists as the method of projecting structured light.

Though scene is captured multiple times by utilizing a single lens, and distance can be determined through the feedback signal of an auto-focusing apparatus. However, auto-focusing generally requires a period of time to complete, and unable to satisfy a real-time human and machine interaction requirement.

SUMMARY

An exemplary embodiment provides an interactive display system which includes an image provider and a ranging apparatus. Then image provider provides a display image. The ranging apparatus includes an image sensor, an imaging lens, and a processor. The imaging lens is configured to image an object on the image sensor to produce an image of the object having a plurality of image parameters onto the image sensor, wherein the image parameters change differently with change of an object distance of an object, and the image sensor converts the image of the object into a signal. The processor is configured to determine whether the object is within a predetermined object distance range according to the signal and different changes of the image parameters with the change of the object distance. When the processor determines that the object is within the predetermined object distance range, the processor determines that the object touches the display image.

An exemplary embodiment provides a ranging apparatus which includes an image sensor, an imaging lens, and a processor. The imaging lens is configured to image an object on the image sensor to produce an image signal having at least one image parameter, wherein the at least one image parameter changes with a change of an object distance of the object. The processor is configured to determine the change of the object distance according to a change of the at least one image parameter.

An exemplary embodiment provides a ranging method which includes forming an image of the object by an image lens; causing the image to have at least one image parameter by the image lens, wherein the at least one image parameter changes with a change of an object distance of the object; and determining the change of the object distance according to a change of the at least one image parameter.

Several exemplary embodiments accompanied with figures are described in detail below to further describe the disclosure in details.

BRIEF DESCRIPTION OF THE DRAWINGS

The accompanying drawings are included to provide further understanding and are incorporated in and constitute a part of this specification. The drawings illustrate exemplary embodiments and, together with the description, serve to explain the principles of the disclosure.

DETAIL DESCRIPTION OF DISCLOSED EMBODIMENTS

Figure 1A:
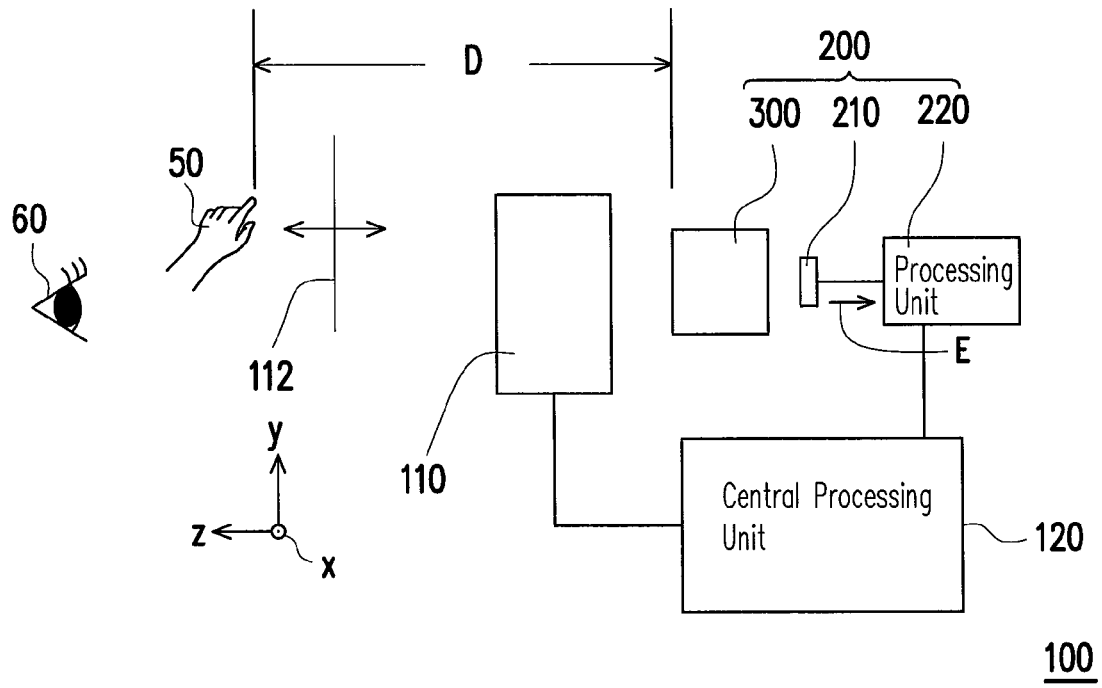
FIG. 1A is a diagram illustrating an interactive display system according to an exemplary embodiment.
Figure 1B:
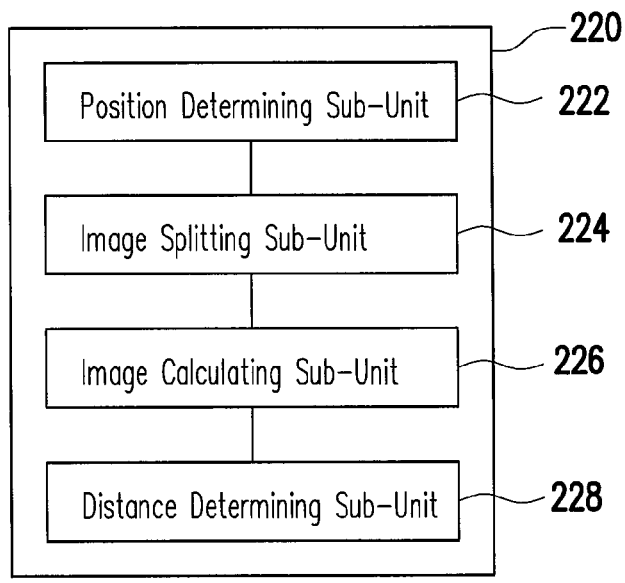
FIG. 1B illustrates a processing sub-unit in the processor of FIG. 1A.
Figure 2:
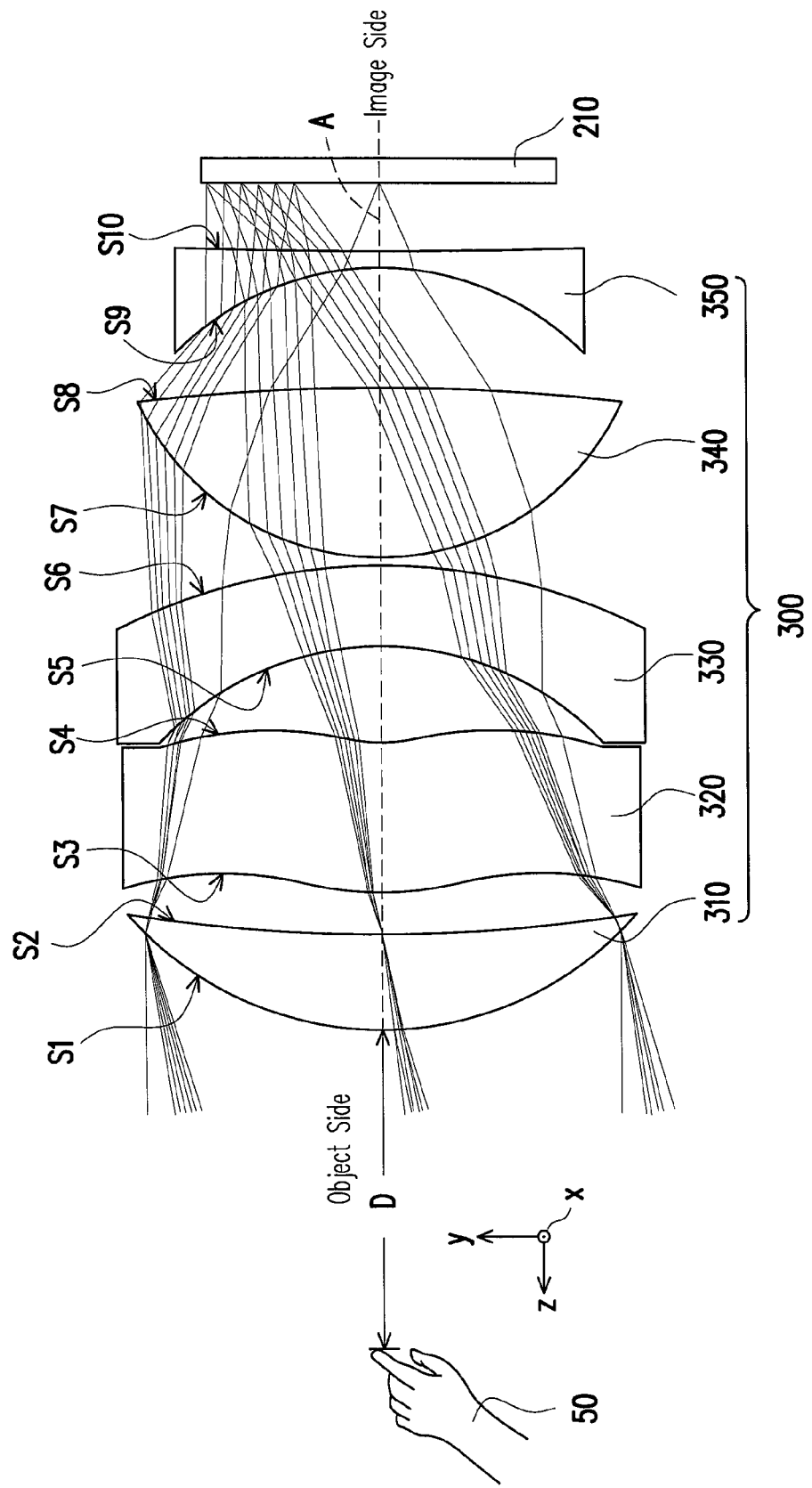
FIG. 2 is a diagram illustrating a ranging apparatus in FIG. 1A.
Figure 3A:
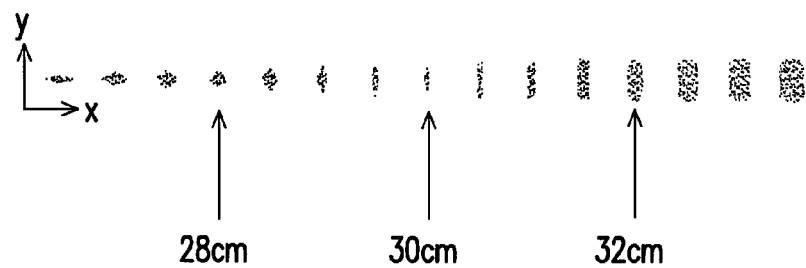
FIG. 3A illustrates the energy distributions of the point spread functions of an imaging lens in FIG. 2 at different object distances.
Figure 3B:
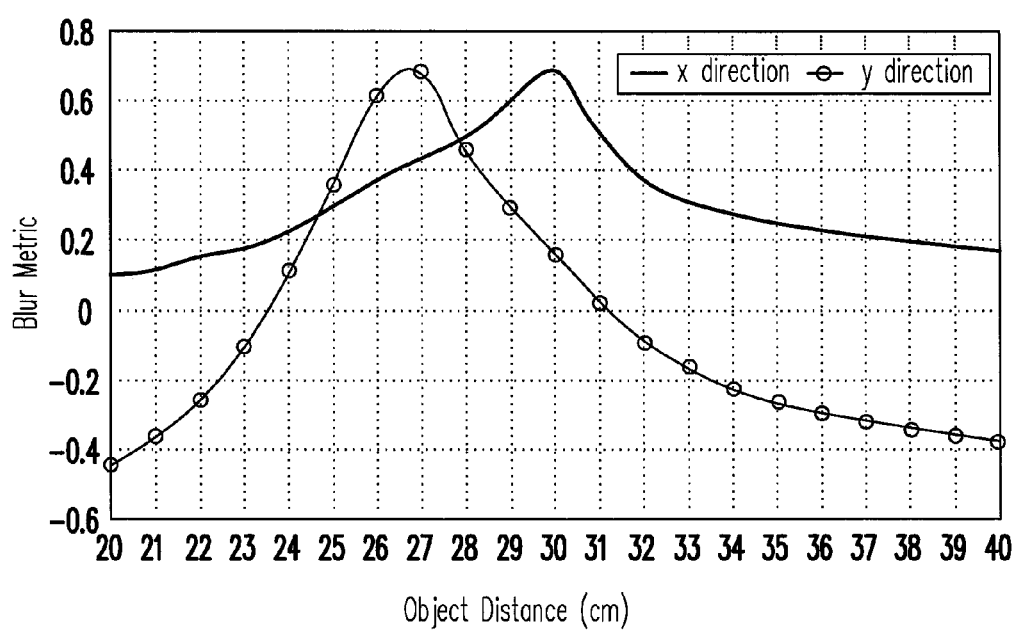
FIG. 3B shows curves illustrating that a plurality of image parameters of the image formed by the imaging lens change with changes of the object distance.

FIG. 1A is a diagram illustrating an interactive display system according to an exemplary embodiment. FIG. 1B illustrates a processing sub-unit in the processor of FIG. 1A. FIG. 2 is a diagram illustrating a ranging apparatus in FIG. 1A. FIG. 3A illustrates the energy distributions of the point spread functions of an imaging lens in the FIG. 2 at different object distances. FIG. 3B shows curves illustrating that a plurality of image parameters of the image formed by the imaging lens change with the change of the object distance. Referring to FIG. 1A, FIG. 2, FIG. 3A, and FIG. 3B, an interactive display system 100 includes an image provider 110 and a ranging apparatus 200. The image provider 110 forms a display image 112. In this embodiment, the image provider 110 forms the display image 112 in space. The space may be filled with air, water, gas, or liquid, or the space may be a vacuum space. For example, in this embodiment, the space is the air. In this embodiment, for example, the display image 112 is a real image. However, in other embodiments, the display image 112 may be a virtual image. Furthermore, the image provider 110 may be a projector, stereoscopic display, or any other image generating apparatuses that is able to form real image or virtual image in the space.

The ranging apparatus 200 includes an imaging lens 300, an image sensor 210, and a processor 220. The imaging lens 300 is configured to image an object 50 on the image sensor 210 to produce an image of the object 50, having at least one image parameter (a plurality of image parameters are taken as an example in this embodiment), onto the image sensor 210. The image parameters change differently with the change of an object distance D of the object. The object distance D is the distance from an object in the space to the imaging lens 300, such as the distance from an object 50 to a surface S1, which is closest to the object side, of a first lens 310, which is closest to the object side, of the imaging lens 300 along an optical axis A of the imaging lens 300. In this embodiment, the image parameters include image blur metrics (the image blur metric is also referred to as sharpness) in two different directions, and two different directions may be substantially perpendicular to each other. For example, the space where the object 50 and the ranging apparatus 200 are located can be defined by the Cartesian coordinate system having an x-axis, a y-axis, and a z-axis, wherein the x-axis, the y-axis, and the z-axis are orthogonal with respect to each other. The two different directions mentioned above may be the x direction and y direction.

The image blur metric (also referred to as sharpness) is a value related to the blurry level of an image, and method of generating this value may refer to at least one of an article with title of "The Blur Effect: Perception and Estimation with a New No-Reference Perceptual Blur Metric" in the periodic journal of "SPIE Electronic Imaging Symposium Conf Human Vision and Electronic Imaging", San Jose: Etats-Unis d'Amerique (2007) hal-00232709, version 1-1 Feb. 2008, and the article is published by Frederique Crete, Thierry Dolmiere, Patricia Ladret, and Marina Nicolas of the Laboratoire des Images et des Signaux; an article with title of "An Edge Analysis Based Blur Measure for Image Processing Applications" which is published by Yun-Chung Chung, Shyang-Lih Chang, Jung-Ming Wang, and Sei-Wang Chen in the "Journal of Taiwan Normal University: Mathematics, Science & Technology", 2006, 51(1), page 21-31; an article with title of "Objective no-reference image blur metric based on local phase coherence" which is published by A. Ciancio, A. L. N. T. da Costa, E. A. B. da Silva, A. Said, R. Samadani, and P. Obrador in the "ELECTRONICS LETTERS", $5^{th}$, November 2009, Vol. 45, No. 23; an article with title of "Novel no-reference image blur metric based on block-based discrete cosine transform statistics" which is published by Yu Han, Xiaoming Xu, and Yunze Cai in the periodic journal of "Optical Engineering (OE) Letters", May 2010/Vol. 49(5), page 050501-1 to page 050501-3; a documentation with title of "Image Blur Metrics" by Aditya Anchuri Stanford University, MS 2011 Ref: Dr. Joyce Farrell PSYCH 221; an article with title of "A NO-REFERENCE PERCEPTUAL BLUR MET- RIC USING HISTOGRAM OF GRADIENT PROFILE SHARPNESS" published by Luhong Liang, Jianhua Chen, Siwei Ma, Debin Zhao, and Wen Gao in the periodic journal of "2009 IEEE International Conference on Imaging Processing (ICIP)", pages 4396-4372; an article with title of "A No-Reference Image Blur Metric Based on the Cumulative Probability of Blur Detection (CPBD)" published by Niranjan D. Narvekar, and Lina J. Karam, Senior Member, IEEE in the periodic journal of "IEEE TRANSACTIONS ON IMAGE PROCESSING", VOL. 20, NO. 9, SEPTEMBER 2011; and an article with title of "A NO-REFERENCE PERCEPTUAL BLUR METRIC" published by Pina Marziliano, Frederic Dufaux, Stefan Wnkler, and Touradj Ebrahimi in the periodic journal of "2002 IEEE International Conference on Imaging Processing (ICIP)", pages 111-57 to 111-60, which articles are hereby incorporated by reference herein.

In this embodiment, a larger image blur metric represents that the image is sharper. However, with a different method of calculating the image blur metric in another embodiment, a larger image blur metric can represent that the image is blurrier.

The image sensor 210 converts the image into a signal E, i.e. an image signal. In this embodiment, the signal E has the at least one image parameter (e.g. a plurality of image parameters in this embodiment), and the image parameter changes with a change of the object distance D of the object 50. In this embodiment, the object 50 may be a finger of a user, a hand of a user, a stylus, or any other appropriate touch object. Furthermore, the image sensor 210 may be a charge coupled device (CCD), a complementary metal oxide semiconductor sensor (CMOS), or any other appropriate image sensing device. The processor 220 determines the change of the object distance D according to the change of the image parameter. In this embodiment, the processor 220 determines whether the object 50 is within a predetermined object distance range according to the signal E and the different changes of the image parameters with the change of the object distance D. In this embodiment, when the object 50 is determined to be within the predetermined object distance range by the processor 220, the processor 220 determines that the object 50 touches the display image 112. In other words, the distance between the display image 112 and the imaging lens 300 is within the predetermined object distance range.

The image parameter may include a blur metric, a modulation transfer function, a concentration of energy distribution of a point spread function, or any combination thereof. In this embodiment, the concentration of the energy distributions of the point spread functions of the imaging lens 300 in two different directions reaches extreme values at different object distances D. For example, the dot distribution patterns from left to right in FIG. 3A are respectively the energy distributions of the point spread functions as the object distance D increases. From FIG. 3A, when the object distance is approximately 30 centimeters (cm), the energy distribution of the point spread function in the x direction (e.g. horizontal direction) is most concentrated. In other words, when the object distance is approximately 30 cm, the image blur metric of the imaging lens 300 in the x direction is at maximum (that is the image is sharpest), as illustrated in FIG. 3B. On the other hand, when the object distance is approximately 26.8 cm, the energy distribution of the point spread function in the y direction (e.g. vertical direction) is most concentrated. In other words, when the object distance is approximately 26.8 cm, the image blur metric of the imaging lens 300 in the y direction is at maximum (that is the image is sharpest), as illustrated in FIG. 3B.

In this embodiment, the imaging lens 300 has at least one non-axisymmetric lens (a first lens 310 is used as example in this embodiment illustrated in FIG. 2). The non-axisymmetric lens (such as the first lens 310) has at least one non-axisymmetric curved surface (such as a surface S2 of the first lens 310 in this embodiment), and the profile of the non-axisymmetric curved surface (such as surface S2) is not the same in two difference directions. Therefore, the energy distribution of the point spread function in the x direction and that in the y direction respectively reach the most concentrated statuses at different object distances D; that is, the image blur metric in the x direction and the image blur metric in the y direction reach maximum values at different object distances D, respectively.

In this embodiment, the imaging lens 300 includes the first lens 310, a second lens 320, a third lens 330, a fourth lens 340, and a fifth lens 350 arranged in sequence from the object side towards the image side. The refractive powers of the first lens 310, the second lens 320, the third lens 330, the fourth lens 340, and the fifth lens 350 are respectively positive, negative, negative, positive, and negative. Furthermore, an aperture stop may be located on a surface S2 of the first lens 310.

In detail, the first lens 310 is, for example, a positive meniscus lens with a convex surface facing toward the object side; the second lens 320 is, for example, a negative meniscus lens with a convex surface facing toward the object side; the third lens 330 is, for example, a negative meniscus lens with a convex surface facing toward the image side; the fourth lens 340 is, for example, a biconvex lens; and the fifth lens 350 is, for example, a biconcave lens.

The following contents provide an example of the imaging lens 300. The embodiment of the disclosure is not limited to data listed in the table 1 below, one of the ordinary skill in the art may have appropriate modifications to the parameters or setups in the table 1 after referring to the disclosure, but the modifications made still belong to the scope of the disclosure.

TABLE 1

| Surface | Radius of Curvature (mm) | Interval (mm) | Material | Remark |
|---|---|---|---|---|
| S1 | 6.794 | 1.674 | Z-E48R | First Lens |
| S2 | x: 27.803, y: 27.803 | 0.762 | | |
| S3 | 9.230 | 2.662 | Z-E48R | Second Lens |
| S4 | 7.420 | 1.684 | | |
| S5 | −4.785 | 1.417 | OKP4HT | Third Lens |
| S6 | −8.489 | 0.140 | | |
| S7 | 3.970 | 3.000 | Z-E48R | Fourth Lens |
| S8 | −15.020 | 2.164 | | |
| S9 | −4.500 | 0.300 | OKP4HT | Fifth Lens |
| S10 | 85.319 | | | |

In table 1, interval means the linear distance between two adjacent surfaces along the optical axis A. For example, the interval of the surface S1 is the linear distance between the surface S1 and surface S2 along the optical axis A. The thickness and material corresponding to each lens listed in the remark column may be found by referring to the data and material code corresponding to the interval and material columns.

Furthermore, in table 1, the surfaces S1 and S2 are two surfaces of the first lens 310, the surfaces S3 and S4 are two surfaces of the second lens 320, the surfaces S5 and S6 are two surfaces of the third lens 330, the surfaces S7 and S8 are two surfaces of the fourth lens 340, and the surfaces S9 and S10 are two surfaces of the fifth lens 350. Refer to table 1 for each radius of curvature, interval, and other parameters that are related to the surfaces, and the descriptions of the above parameter are not repeated here. For the radius of curvature in the surface S2 row, the value after "x:" is the radius of curvature of the surface S2 in the x direction, and the value after "y:" is the radius of curvature of the surface S2 in the y direction.

In addition, the aforementioned surfaces S1 and S3-S10 are aspheric surfaces and can be represented by the following formula, $$Z = \frac{cr^2}{1+\sqrt{1-(1+k)c^2r^2}} + A_1r^2 + A_2r^4 + A_3r^6 + A_4r^8 + A_5r^{10} + \ldots$$

In the above formula, Z is a sag in the direction of the optical axis A, and c is inverse of the radius of osculating sphere, i.e. the inverse of the radius of curvature (such as the radius of curvature of the surfaces S1 and S3-S10 in table 1) close to the optical axis A. The k is a conic coefficient. The r is the height of aspheric surface, which is the height from the center of lens to the edge of lens, and coefficients $A_1, A_2, A_3, A_4, A_5 \ldots$ are aspheric coefficients, wherein the coefficient $A_1$ is 0. Table 2 lists the parameter values of surfaces S1 and S3-S10.

TABLE 2

| Aspheric parameter | Conic coefficient k | Coefficient $A_2$ | Coefficient $A_3$ | Coefficient $A_4$ | Coefficient $A_5$ |
|---|---|---|---|---|---|
| S1 | 0.9111 | 1.668E−04 | −1.230E−05 | 0.000 | 0.000 |
| S3 | 0.0000 | −2.716E−03 | −9.844E−07 | 0.000 | 0.000 |
| S4 | 0.0000 | −5.589E−03 | 2.016E−05 | 0.000 | 0.000 |
| S5 | −0.5669 | 1.587E−03 | −1.236E−04 | 0.000 | 0.000 |
| S6 | 0.01324 | 2.036E−03 | −6.336E−05 | 0.000 | 0.000 |
| S7 | −0.3221 | −1.230E−03 | 2.764E−06 | 0.000 | 0.000 |
| S8 | 5.7213 | 1.898E−03 | −2.104E−05 | 0.000 | 0.000 |
| S9 | 0.4242 | −3.378E−03 | 5.607E−04 | 0.000 | 0.000 |
| S10 | 0.0000 | −4.630E−03 | 4.539E−04 | 0.000 | 0.000 |

Furthermore, the variation of curvature of the surface S2 in the x direction and that in the y direction are not the same, and the surface S2 can be described by the following formula:

$$Z = \frac{cr^2}{1+\sqrt{1-(1+k)c^2r^2}} + \sum_{j=2}^{66} C_j x^m y^n,$$

$$\text{where } j = \frac{(m+n)^2 + m + 3n}{2} + 1.$$

Furthermore, in the formula, Z is the sag in the direction of the optical axis A, and c is inverse of the radius of osculating sphere, i.e. the inverse of the radius of curvature (such as the radius of curvature of the surfaces S2 in table 1) close to the optical axis A. The k is a quadratic surface coefficient (conic). The r is height of the surface, which is the height from the center of lens to the edge of lens. Coefficients $C_j$ are coefficients of $x^m y^n$, x is the position of the x coordinate, y is the position of the y coordinate, and the position at x=0 and y=0 is on the optical axis A, wherein m is 0 or integer, and n is 0 or integer, but m and n are not both 0. In this embodiment, $C_4$=2.000E−04 (that is 2.000×10$^4$), $C_6$=−2.000E−04, $C_8$=1.000, and the remaining $C_j$'s are 0 substantially.

TABLE 3

| Parameter | Specification |
|---|---|
| Image Height | 3 mm (⅓ inch, 2 megapixels) |
| Focal Length | 9.5 mm |
| f-number | 1.2 |
| Angular Field of View | 33.6 degrees |
| Object Distance | 300 mm |
| Relative Illumination | >50% |
| Optical Distortion | <2% |
| Chief Ray Angle (CRA) | Maximum CRA <28.6 degrees |

The specification of the imaging lens 300 according to an exemplary embodiment is listed in Table 3. However, the disclosure is not limited thereto. The left column of Table 3 lists the name of parameters, and the right column lists the specifications corresponding to the parameters. In Table 3, the image height means the image height of the utilized image sensor 210 is 3 mm, and the image sensor 210 is an image sensor with ⅓ inch and 2 megapixels.

In an ranging apparatus 200 of this embodiment, two image parameters are respectively a blur metric in the x direction and a blur metric in the y direction which change differently with the change of the object distance D. Therefore, the processor 220 may determine the object distance D of the object 50 according to two image values which respectively correspond to the blur metrics in the x and y directions in the signal E. In this embodiment, according to a threshold of the image parameters, the processor 220 can further determines whether the processor 220 is to start to determine whether the object 50 is within the predetermined object distance range of according to the signal E. For example, referring to FIG. 3B, when the threshold is 0.4, and when at least one of the image values in the signal E which respectively correspond to the blur metrics in the x and y directions is more than or equal to 0.4, the processor 220 starts to determine whether the object 50 is within the predetermined object distance range according to the signal E. At this time, the processor 220 may learn that the object distance D is within a range of 25.2 cm to 31.8 cm according to the relationship showing in FIG. 3B. The relationship showing in FIG. 3B can be learned beforehand (such as before leaving a factory) through an experiment or a calibration procedure, and then store the relationship in the ranging apparatus 200, such as in a memory of the ranging apparatus 200. Furthermore, the processor 220 may determine which one of the image values that respectively correspond to the blur metric in the x direction and the blur metric in the y direction is greater in order to determine whether the object distance D is within the range of 25.2 cm to 27.8 cm or 27.8 cm to 31.8 cm. For example, when the image value in the x direction is less than the image value in the y direction, the processor 220 can determine that the object distance D is within the range of 25.2 cm to 27.8 cm.

Next, if the image value corresponding to the blur metric in the y direction in the signal E is 0.6, the processor 220 can further reduce the possible range of object distance D. For example, the object distance D can be 26 cm or 27.5 cm. When the image value corresponding to the blur metric in the y direction in the signal E is 26 cm or 27.5 cm, the image value corresponding to blur metric in the x direction is not the same. Therefore, the processor 220 can determine the object distance D to be 26 cm or 27.5 cm according to the image value corresponding to the blur metric in the x direction in the signal E. When the distance between the object image 112 and capturing lens 300 is 26 cm, and when the processor 220 determines that the object distance D is approximately 26 cm, the processor 220 determines that the object 50 is within the predetermined object distance range and the object 50 touches the display image 112. If the processor 220 determines the object distance D to be 27.5 cm, the processor 220 determines that the object 50 is not within the predetermined object distance range and the object does not touch the display image 112, but the object distance D can still be learned to be 27.5 cm. With the same reason, when the image value is 0.4 or other values above, the processor 220 can determine the object distance by comparing the image values in the signal E with the blur metrics in the x direction and the y direction of FIG. 3B.

In the ranging apparatus 200 of this embodiment, the blur metric in the x direction and the blur metric in the y direction reach the extreme value at different object distances D, and the blur metric in the x direction and the blur metric in the y direction change differently with the change of the object distance D. Therefore, the processor 220 of the ranging apparatus 200 can determine the object distance D accordingly; that is, the processor 220 can select the threshold according to the extreme value of image parameters (that is the blur metrics in the x and y directions) with respect to the object distance D. Then, the object distance D of object 50 is determined according to the extreme value and the threshold.

Furthermore, in this embodiment, the ranging apparatus 200 utilizes a plurality of image parameters (such as the blur metric in the x direction and the blur metric in the y direction) to determine the object distance D. Therefore, the processor 220 can determine the object distance D of object 50 according to the signal E obtained by the image sensor 210 at a single shot; that is, the object distance D of object 50 can be determined according to a single image obtained from a single image formation for the object 50 by the imaging lens 300. Therefore, the ranging apparatus 200 of this embodiment is able to learn the object distance D immediately through the processing of the processor 220 after the completion of the single shot. By contrast, the conventional ranging apparatus requires a period of time for the completion of focusing to learn the object distance D, or learns the object distance D through multiple shots. Therefore, the ranging apparatus 200 of this embodiment can quickly and immediately determine the object distance D. When the ranging apparatus 200 shots repeatedly and determines the object distances D immediately after each shot, the effect of real-time detection of the object distances D of the object 50 is achieved by the ranging apparatus.

Besides, the ranging apparatus 200 can determine the object distance D by utilizing a single lens. Therefore, the volume of the ranging apparatus 200 of this embodiment can be smaller comparing to a ranging apparatus with double lens. In addition, the ranging apparatus 200 of this embodiment is able to determine the object distance D without emitting a detecting light, so that an additional light source may be not required. Therefore, the volume of the ranging apparatus 200 of this embodiment can be smaller. In addition, the ranging apparatus 200 determines the object distance D by utilizing a method of analyzing the image parameters. By contrast, the ranging apparatus that utilizes time-of-flight method to measure the object distance requires an electrical circuit that is able to process high frequency signals. Therefore, the ranging apparatus 200 of this embodiment may not require an electrical circuit that is able to process high frequency signal, and thus reduces cost.

Referring to FIG. 1A and FIG. 1B, in this embodiment, the processor 220 includes a position determining sub-unit 222, an image splitting sub-unit 224, an image calculation sub-unit 226, and a distance determining sub-unit 228. The position determining sub-unit 222 determines the position of the object 50 in the directions perpendicular to the object distance D according to the signal E. Namely, in this embodiment, is the position determining sub-unit 222 determines the x coordinate and the y coordinate of object 50. In detail, the actual x coordinate and y coordinate of the object 50 are reversely deduced according to the x coordinate and the y coordinate of the portion of the image, which are detected by the image sensor 210, corresponding to the object 50.

The image splitting sub-unit 224 selects an area of the image to be analyzed corresponding to the object 50 from the image. For example, the image splitting sub-unit 224 can analyze the section near the x coordinate and the y coordinate obtained by the position determining sub-unit 222 in the image to obtain the area of the image to be analyzed. If the object 50 is a finger, the image splitting sub-unit 224 can select the area of the image located near the x coordinate and the y coordinate obtained by the position determining sub-unit 222 that have the color of skin to be the area of the image to be analyzed.

The image calculation sub-unit 226 calculates a plurality of image values which respectively correspond to the image parameters (such as the blur metrics in the x and y directions) according to the selected image to be analyzed. In addition, the distance determining sub-unit 228 determines the object distance D of the object 50 according to the calculated image values. Namely, the distance determining sub-unit 228 can determine the object distance D of the object 50 by comparing the image values with the above image parameters. The detail descriptions have been described above, which are thus not repeated herein.

In this embodiment, the interactive display system 100 further includes a processor 120, which is electrically connected to the processor 220 and the image provider 110. In other embodiments, the processor 120 and the processor 220 may be in wireless connection. For example, the processor 120 and the processor 220 may be coupled by wireless transmission, the wireless network, or any other wireless connection. When the processor 220 determines that the object touches the display image 112, the processor 120 can determine which one of the icons or items in the display image 112 touched by the object 50 according to the x coordinate and the y coordinate of the object 50 determined by the processor 220. The above can be achieved through mapping the x coordinate and y coordinate of the object 50 onto the x coordinate and y coordinate of the display image 112 by the processor 120. Next, the processor 120 can determine how to change the display image 112 through commanding the image provider 110 according to the touching way of the object 50. For example, when the object 50 performs point-selecting or dragging operation on the icon or item in the display image 112, the processor 120 can command the display image 112 to display the display image 112 corresponding to the point-selecting operation or move the position of the icon or item in the display image 112.

In this embodiment, the number of the object 50 may be one or more. When the number of the object is more than one, the processor 220 can analyze the portions in the image that respectively correspond to the plurality of object to achieve multi-touch function for the interactive display system 100. In another embodiment, the processor 220 and the processor 120 can be integrated together.

Furthermore, the ranging apparatus 200 is utilized for the interactive display system 100 in this embodiment, so that a user is able to interact with the display image 112 that flows in the air. In another words, an effect of contacting and touching the display image 112 in the air may be simulated for a user. In detail, the position of the display image is known at time when the image provider 110 generates the display image 112. Therefore, whether the object 50 touches the display image 112 that flows in the air can be known after the position of the object 50 (e.g. the finger of a user) is determined through the ranging apparatus 200. Furthermore, how to change the display content of the display image 112 can be determined according to the movement way of the object 50.

Figure 4:
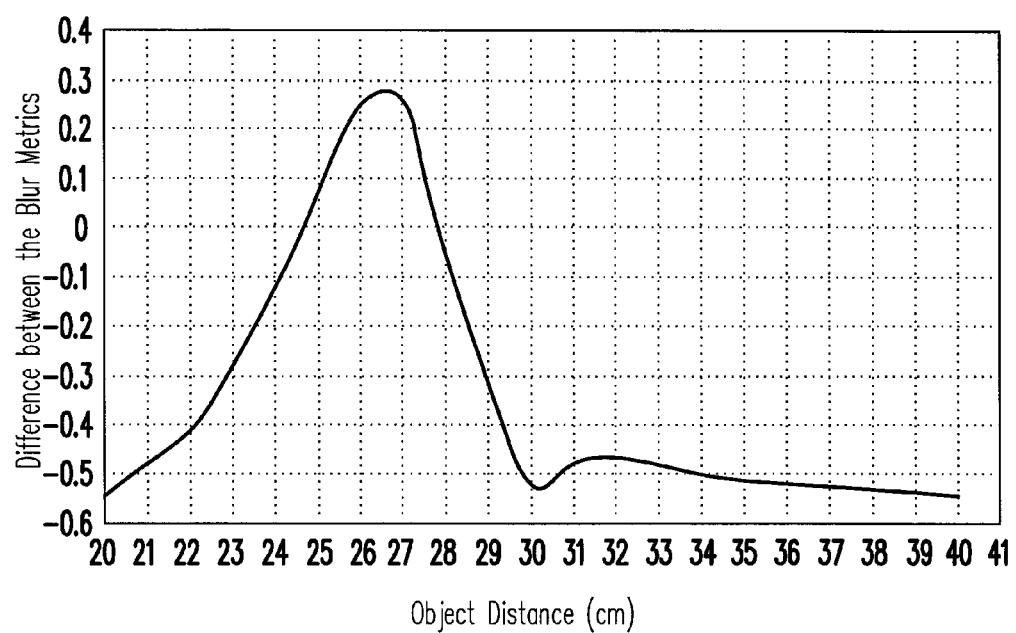
FIG. 4 is a curve illustrating the difference between the blur metric in the x direction and the blur metric in the y direction in FIG. 3B with the change of the object distance.

FIG. 4 is a curve illustrating the difference between the blur metric in the x direction and the blur metric in the y direction in FIG. 3B with the change of the object distance. Referring to FIG. 1A and FIG. 4, in another exemplary embodiment, the processor 220 can determine whether the object 50 is within the predetermined object distance range according to the change of the difference between the image parameters (e.g. the difference obtained by subtracting the image values corresponding to the blur metric in the x direction from the image values corresponding to the blur metric in the y direction or the difference obtained by subtracting the image values corresponding to the blur metric in the y direction from the image values corresponding to the blur metric in the x direction) with the change of the object distance. At this time, the threshold is not required to be selected, and whether to start to further analyze the object distance D by the processor 220 can be determined by determining whether the difference (e.g. the difference obtained by subtracting the image value corresponding to the blur metric in the y direction from the image value corresponding to the blur metric in the x direction) between the image values in the signal E is greater than zero through the processor 220. For example, when the difference of the image value is greater than zero and is 0.2, the processor 220 can determine the object distance D to be 25.5 cm or 27.3 cm. Alternatively, whether the object 50 is within the predetermined object distance range may be determined by determining whether the difference reaches the extreme value. For example, when the distance between the display image 112 and the imaging lens 300 is 26.8 cm, the processor 220 determines whether the object 50 is within the predetermined object distance range through determining whether the difference reaches a maximum value. Namely, in this way, and the processor 220 may determine whether the object 50 touches the display image 112.

Figure 5:
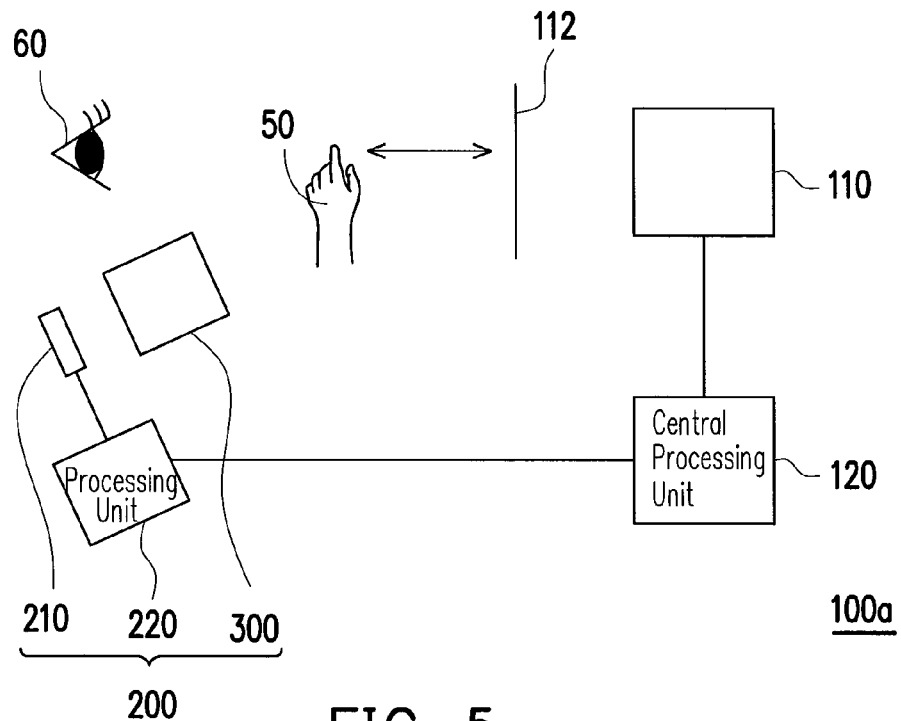
FIG. 5 is a diagram illustrating an interactive display system according to another exemplary embodiment.

FIG. 5 is a diagram illustrating an interactive display system according to another exemplary embodiment. An interactive display system 100a in this embodiment and the interactive display system 100 in FIG. 1A are similar, and the differences between the two are described in the following. In the interactive display system 100 of FIG. 1A, the image provider 110 and the ranging apparatus 200 are located at the same side of the display image 112, and eyes 60 of a user and the image provider 110 are located at two opposing sides of the display image 112. However, in the inactive display system 100a of this embodiment, the image provider 110 and the ranging apparatus 200 are located at two opposing sides of the display image 112, and the eyes 60 of the user and the ranging apparatus 200 are located at the same side as the display image 112.

Figure 6:
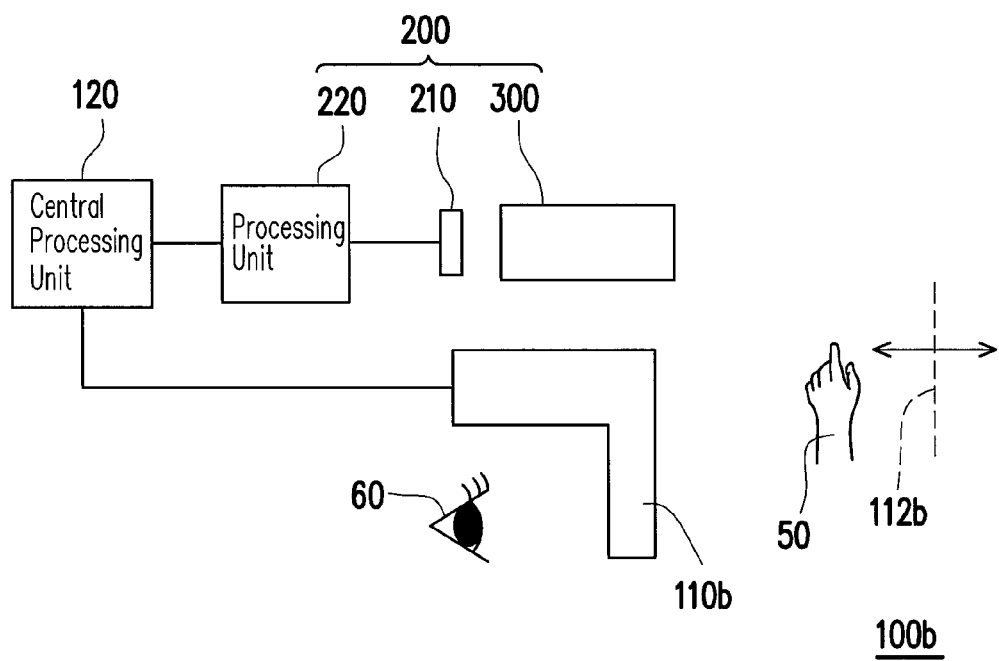
FIG. 6 is a diagram illustrating an interactive display system according to another exemplary embodiment.

FIG. 6 is a diagram illustrating an interactive display system according to another exemplary embodiment. Referring to FIG. 6, an interactive display system 100b of this embodiment and the interactive display system 100a of FIG. 5 are similar, and the difference between the two are described in the following. In the interactive display system 100b of this embodiment, an image provider 110b may be a head-mounted display (HMD), which is disposed in front of the eyes 60 of a user, and the display image 112b is a virtual image. In this embodiment, the image provider 110b, the eyes 60 of the user, and the ranging apparatus 200 are located at the same side of the display image 112.

Figure 7:
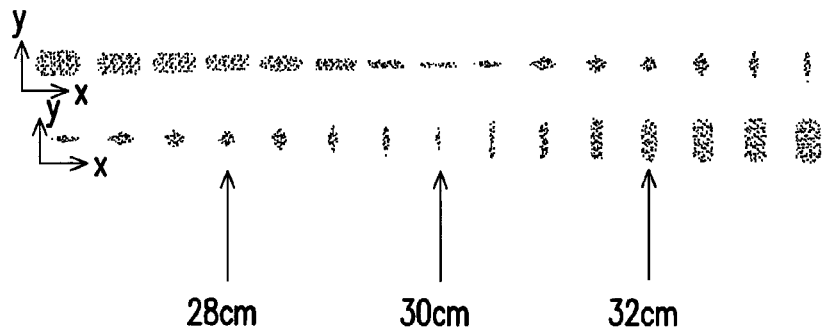
FIG. 7 illustrates the energy distributions of the point spread function of the red light and the point spread function of the green light for the imaging lens at different object distances.
Figure 8:
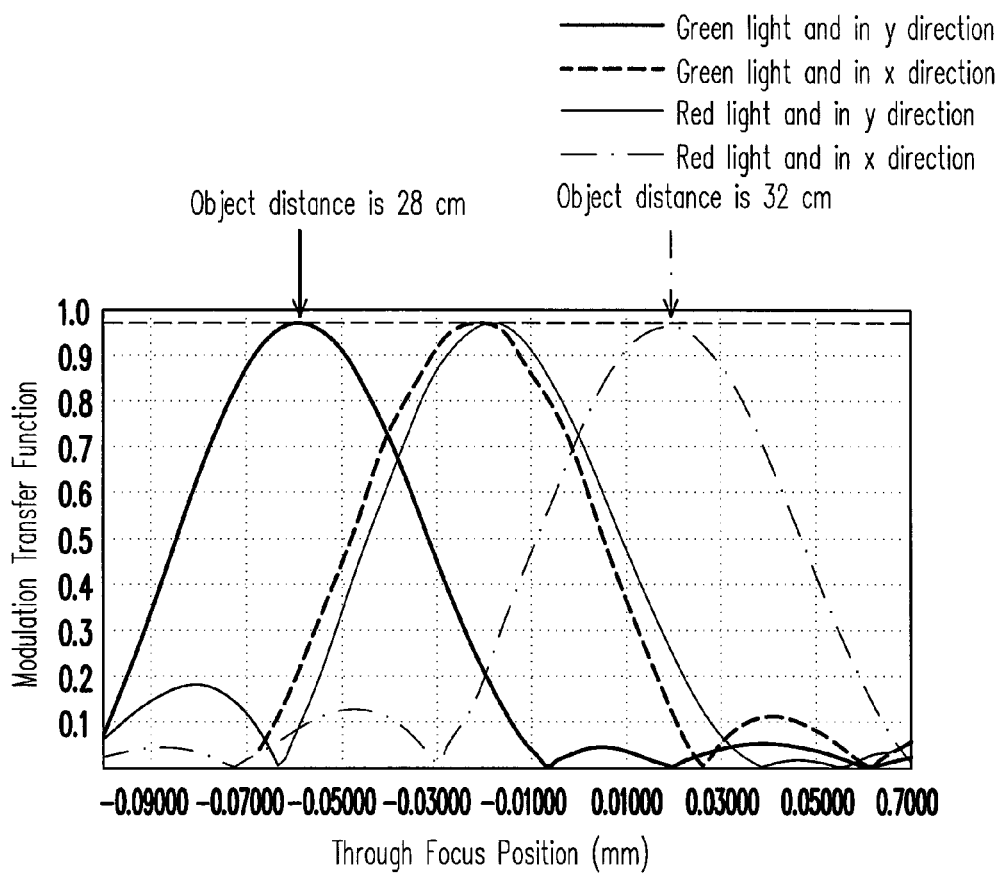
FIG. 8 illustrates a through focus modulation transfer function (through focus MTF) generated by the imaging lens in FIG. 2 under a spatial frequency of 30 line pair/mm.
Figure 9:
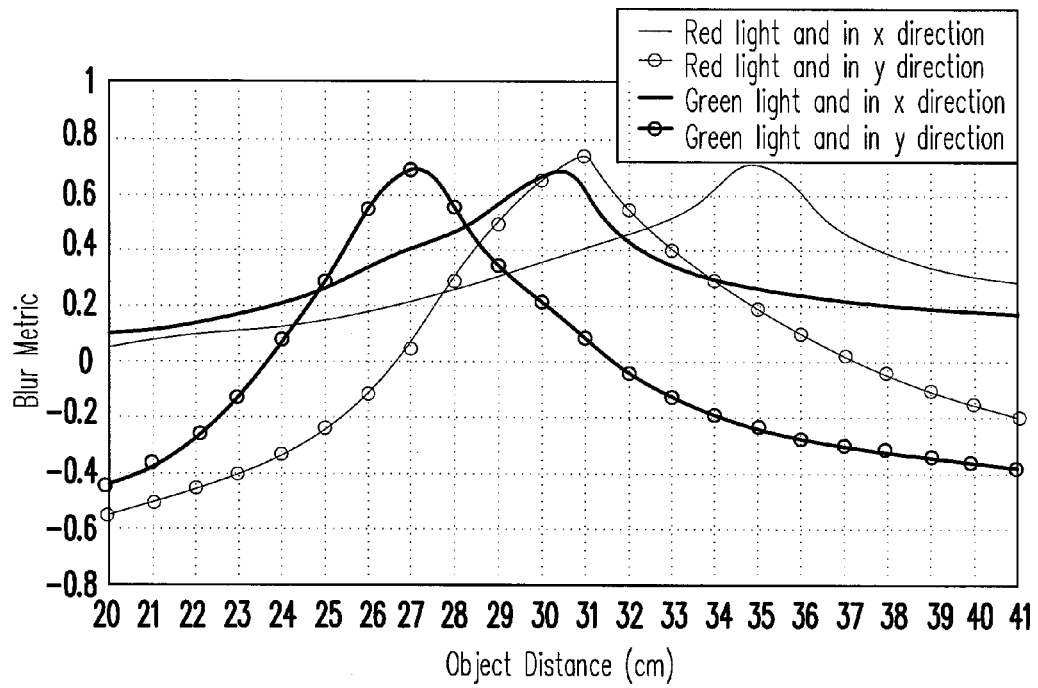
FIG. 9 shows curves illustrating the changes of a red light blur metric in the x direction, a green light blur metric in the x direction, a red light blur metric in the y direction, and a green light blur metric in the y direction generated by the imaging lens with the change of the object distance.

FIG. 7 illustrates the energy distributions of the PSF of the red light and the PSF of the green light for the imaging lens at different object distances. FIG. 8 illustrates a through focus modulation transfer function (through focus MTF) generated by the imaging lens in FIG. 2 under a spatial frequency of 30 line pairs/mm (lp/mm). FIG. 9 shows curves illustrating the changes of a red light blur metric in the x direction, a green light blur metric in the x direction, a red light blur metric in the y direction and a green light blur metric in the y direction generated by the imaging lens with the change of the object distance. Referring to FIG. 7 to FIG. 9, in this embodiment, the energy distributions of the PSFs of lights of different colors of the imaging lens 300 change differently with the change of the object distance D. In detail, in this embodiment, the axial chromatic aberration of the imaging lens 300 divided by the focal length of the imaging lens 300 falls within a range of 0.0010 to 0.0100 or a range of −0.0010 to −0.0100. The axial chromatic aberration of the imaging lens 300 is, for example, the chromatic aberration of lights of different colors corresponding to the image parameters. For example, in this embodiment, the lights of colors corresponding to the image parameters are a red light and a green light, so the axial chromatic aberration may be the axial chromatic aberrations of the red light and the green light, wherein the wavelength of red light may be 640 nanometer (nm), and the wavelength of green light may be 550 nm. In another embodiment, when the lights of colors corresponding to the image parameters are a red light and a blue light, the axial chromatic aberration can be the axial chromatic aberrations of the red light and the blue light. Generally, camera lenses are designed to reduce the axial chromatic aberration. By contrast, the imaging lens 300 of this embodiment has obvious axial chromatic aberrations to have obvious different changes for the blur metric of red light and the blur metric of green light with the change of the object distance D. The energy distributions of the SPFs with the change of the object distance at top row in FIG. 7 is the energy distributions of the SPFs of red light, and the energy distributions of the SPFs with the change of the object distance at the bottom row in FIG. 7 is the energy distributions of the SPFs of green light. It is obvious from FIG. 7 that the change of the energy distribution of the SPF of red light with the change of the object distance is different from the change of the energy distribution of the SPF of green light with the change of the object distance. In addition, from FIG. 8, the through focus MTFs of red light and green light in the x directions and y directions change differently with respect to the degree of out-of-focus (that is with respect to the object distance D). In addition, from FIG. 9, the red light blur metric in the x direction, the green light blur metric in the x direction, the red light blur metric in the y direction and the green light blur metric in the y direction which are generated by the imaging lens 300 change differently with the change of the object distance D.

In the embodiment of FIG. 3B, the processor 220 uses the relationship of two curves as reference bases, and determines the object distance D by comparing the two curves with the corresponding image values in the signal E. By contrast, there are four curves used as reference bases in this embodiment, so more comparison bases can be generated while comparing the corresponding image values of the signal E with the curves. Therefore, the processor 220 of this embodiment is able to more accurately determine the object distance D. In this embodiment, the pressing unit 220 determines the object distance D of the object 50 according to the extreme value of the image parameters (such as the red light blur metric in the x direction, the green light blur metric in the x direction, the red light blur metric in the y direction and the green light blur metric in the y direction) with respect to the object distance D. For example, from FIG. 9, when both the red light blur metric in the y direction and the green light blur metric in the x direction reach the extreme values (e.g. maximum values), the object distance D of the object 50 is determined to be 30 cm. Accordingly, the object 50 is determined to be within the predetermined object distance range. When the distance between the display image 112 and the imaging lens 300 is approximately 30 cm, the processor 220 can determine that the object 50 touches the display image 112.

Figure 10:
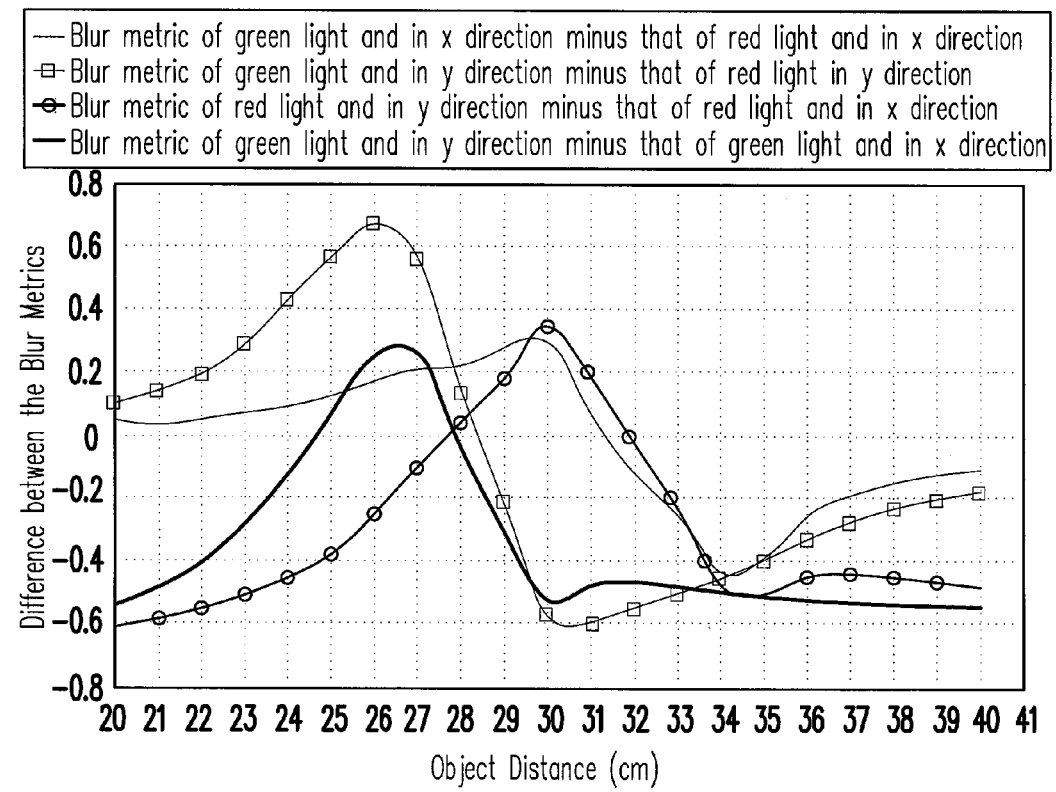
FIG. 10 shows curves illustrating the change of the difference between the green light blur metric in the x direction and the red light blur metric in the x direction, the change of the difference between the green light blur metric in the y direction and the red light blur metric in the y direction, the change of the difference between the red light blur metric in the y direction and the red light blur metric in the x direction, and the change of the difference between the green light blur metric in the y direction and the green light blur metric in the x direction with the change of the object distance D.

FIG. 10 shows curves illustrating the change of the difference between the green light blur metric in the x direction and the red light blur metric in the x direction, the change of the difference between the green light blur metric in the y direction and the red light blur metric in the y direction, the change of the difference between the red light blur metric in the y direction and the red light blur metric in the x direction, and the change of the difference between green light blur metric in the y direction and the green light blur metric in the x direction with the change of the object distance D. Referring to FIG. 1A and FIG. 10, in another embodiments, the processor 220 can determine whether the object 50 is within the predetermined object distance range according to the change of the difference between the image parameters at different object distances D with the change of the object distance D. For example, the difference may be the difference obtained by subtracting the red light blur metric in the x direction from the green light blur metric in the x direction (or the difference obtained by subtracting the green light blur metric in the x direction from the red light blur metric in the x direction in other embodiments), the difference obtained by subtracting the red light blur metric in the y direction from the green light blur metric in the y direction (or the difference obtained by subtracting the green light blur metric in the y direction from the red light blur metric in the y direction in other embodiments), the difference obtained by subtracting the red light blur metric in the x direction from the red light blur metric in the y direction (or the difference obtained by subtracting the red light blur metric in the y direction from the red light blur metric in the x direction in other embodiments), and the difference obtained by subtracting the green light blur metric in the x direction from the green light blur metric in the y direction (or the difference obtained by subtracting the green light blur metric in the y direction from the green light blur metric in the x direction in other embodiments). In this embodiment, the changes of four different differences with the change of the object distance D can be utilized to determine whether the object 50 is within the predetermined object distance range, and the object distance D can be obtained. By comparing with the embodiment in FIG. 4, there are more differences that can be utilized for determination in this embodiment. Therefore, whether the object 50 is within the predetermined object distance range can be determined more accurately. For example, the difference obtained by subtracting the red light blur metric in the x direction from the red light blur metric in the y direction and the difference obtained by subtracting the green light blur metric in the x direction from the green light blur metric in the y direction can be utilized to determine whether the processor 220 is to start to determine whether the object 50 is within the predetermined object distance range, or to start to analyze the signal E to obtain object distance D. Afterward, whether the object 50 is within the predetermined object distance range can be determined or the object distance D of the object 50 is calculated through the difference obtained by subtracting the red light blur metric in the x direction from the green light blur metric in the x direction and the difference obtained by subtracting the red light blur metric in the y direction from the green light blur metric in the y direction.

Figure 11:
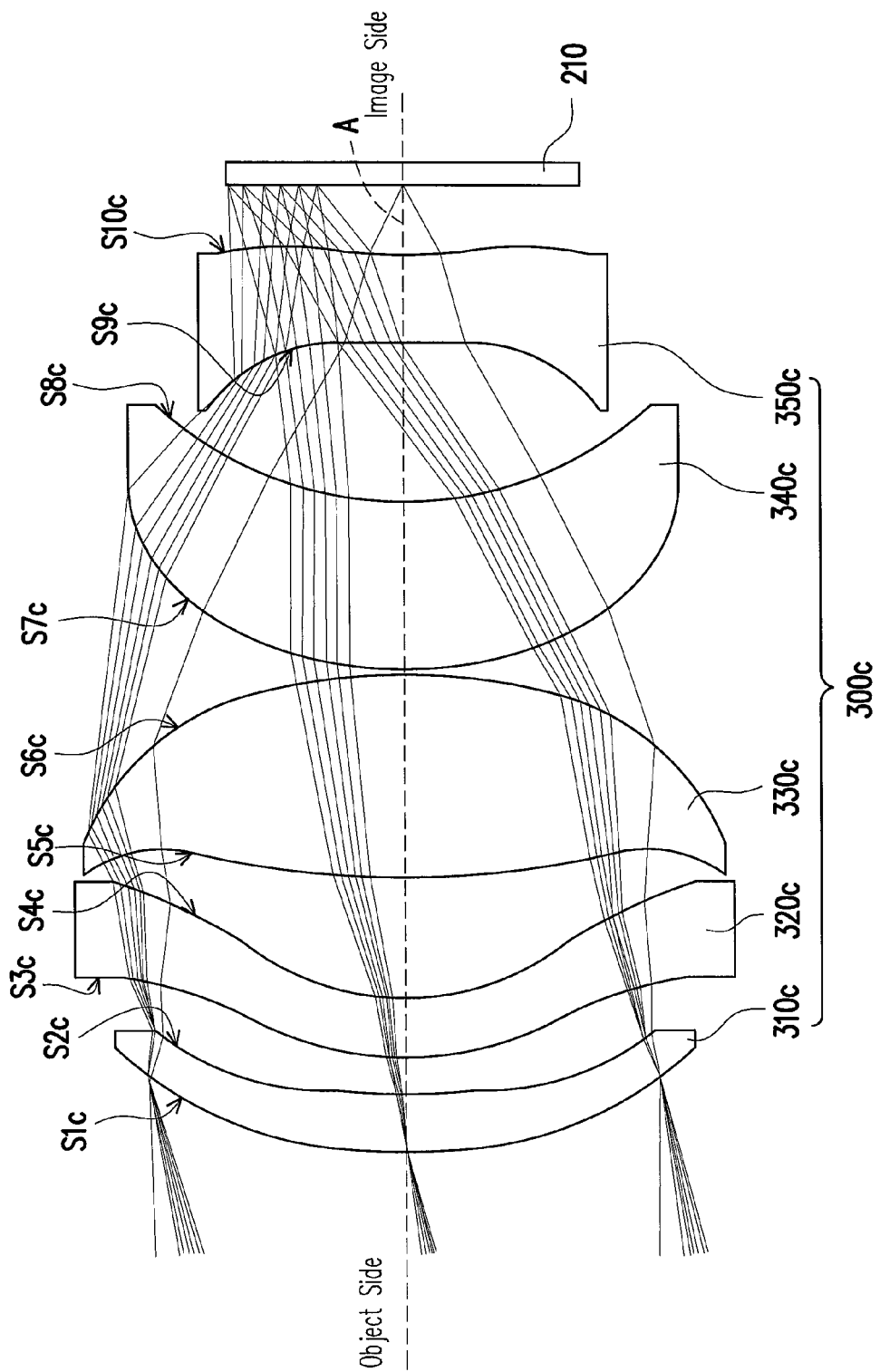
FIG. 11 is a diagram of an imaging lens according to another exemplary embodiment.
Figure 12A:
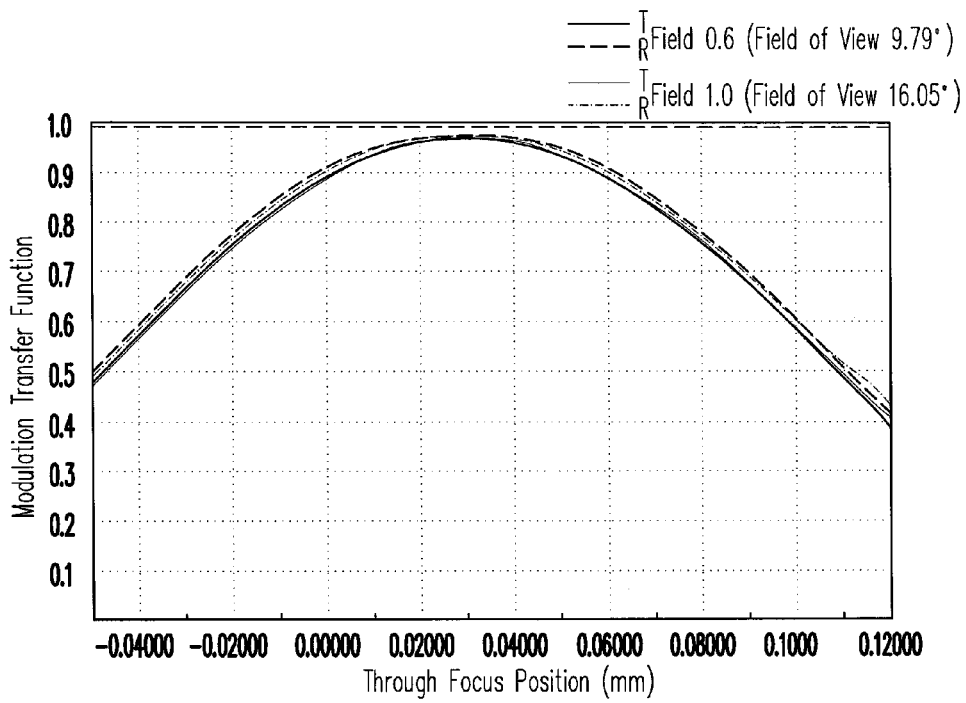
FIG. 12A to FIG. 12G show curves that respectively illustrate the through focus MTFs of the imaging lens of FIG. 11 when the spatial frequencies are respectively 10 lp/mm, 20 lp/mm, 30 lp/mm, 40 lp/mm, 50 lp/mm, 100 lp/mm, and 200 lp/mm.
Figure 12B:
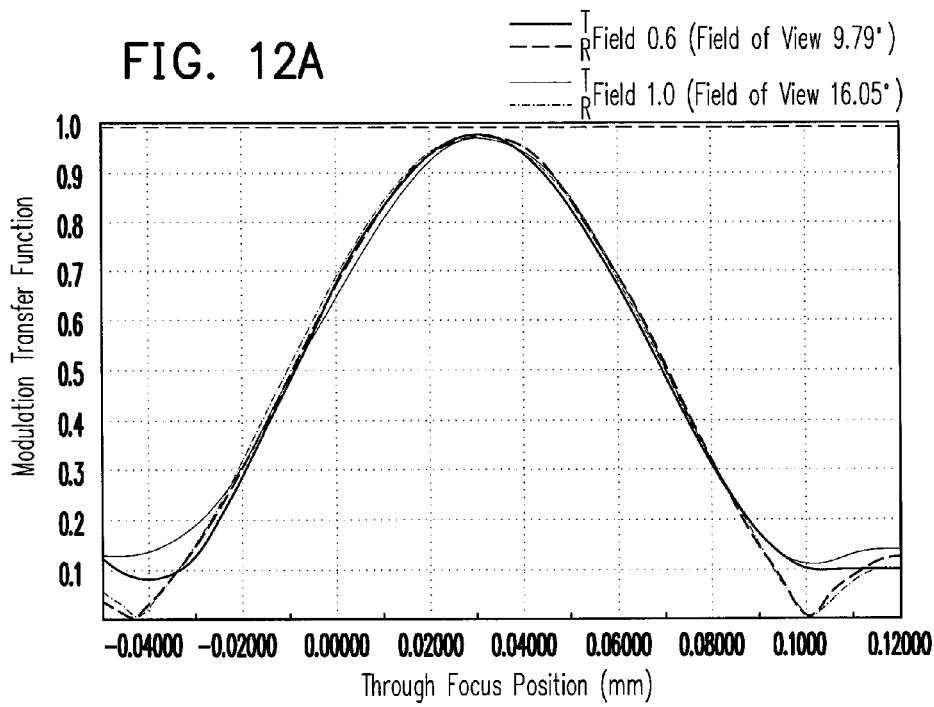
Figure 12C:
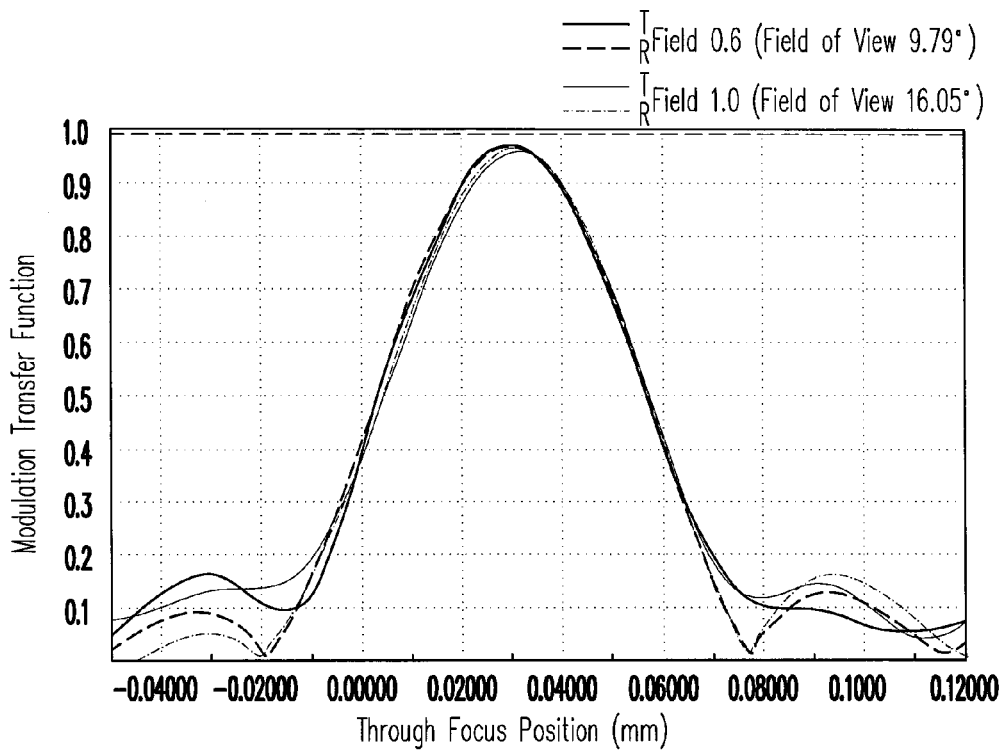
Figure 12D:
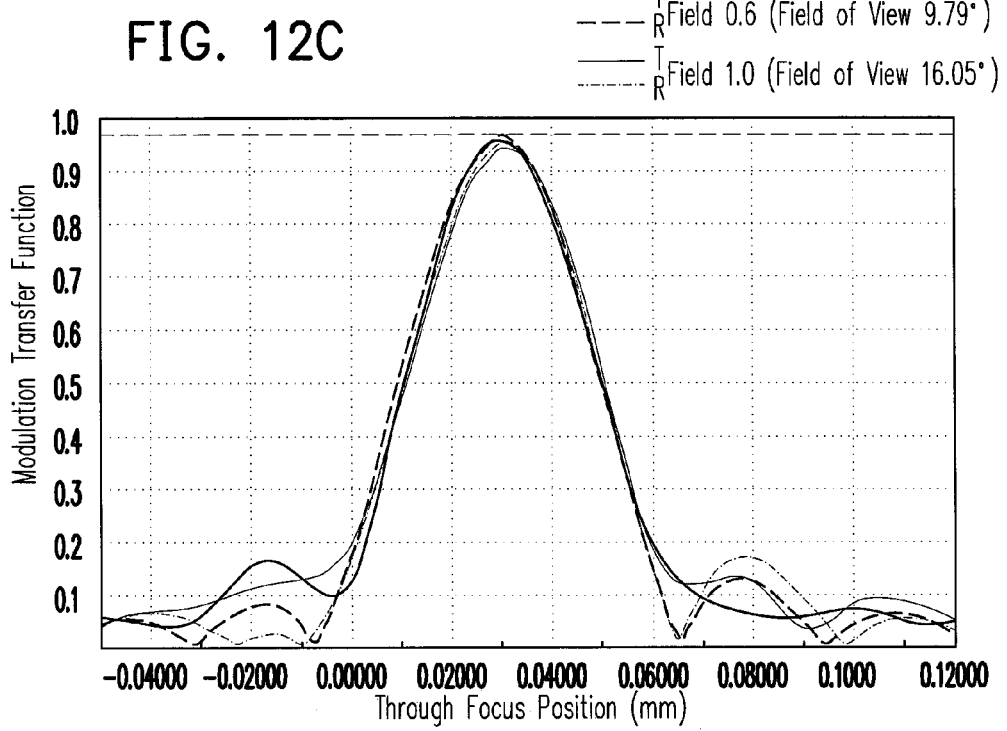
Figure 12E:
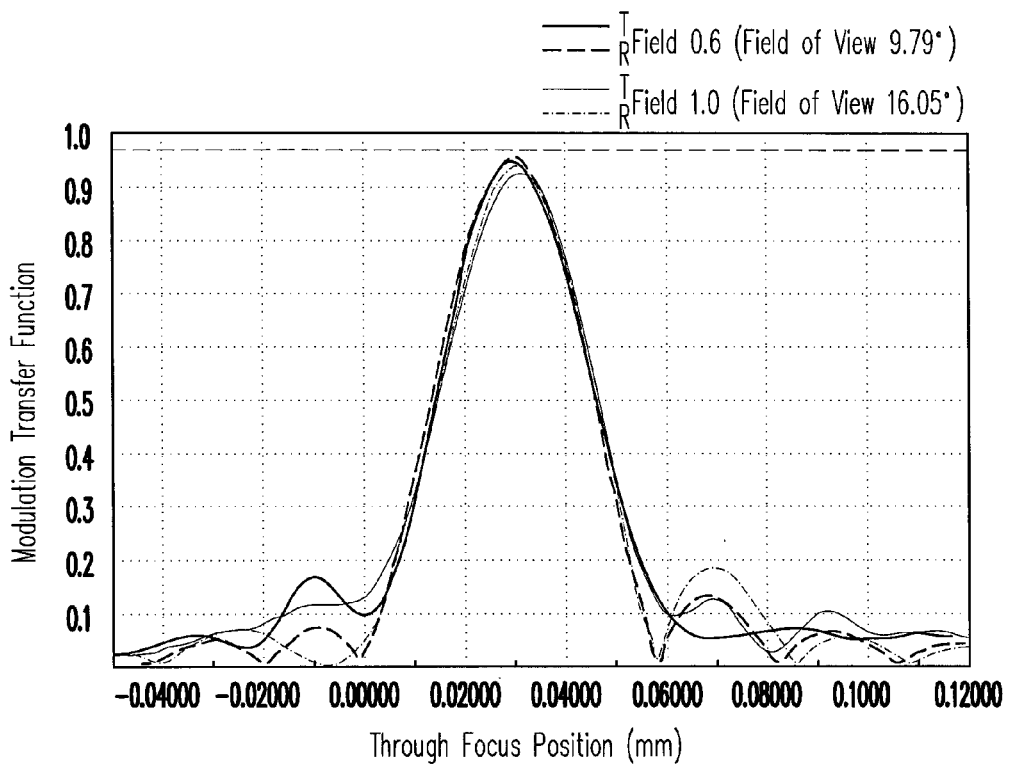
Figure 12F:
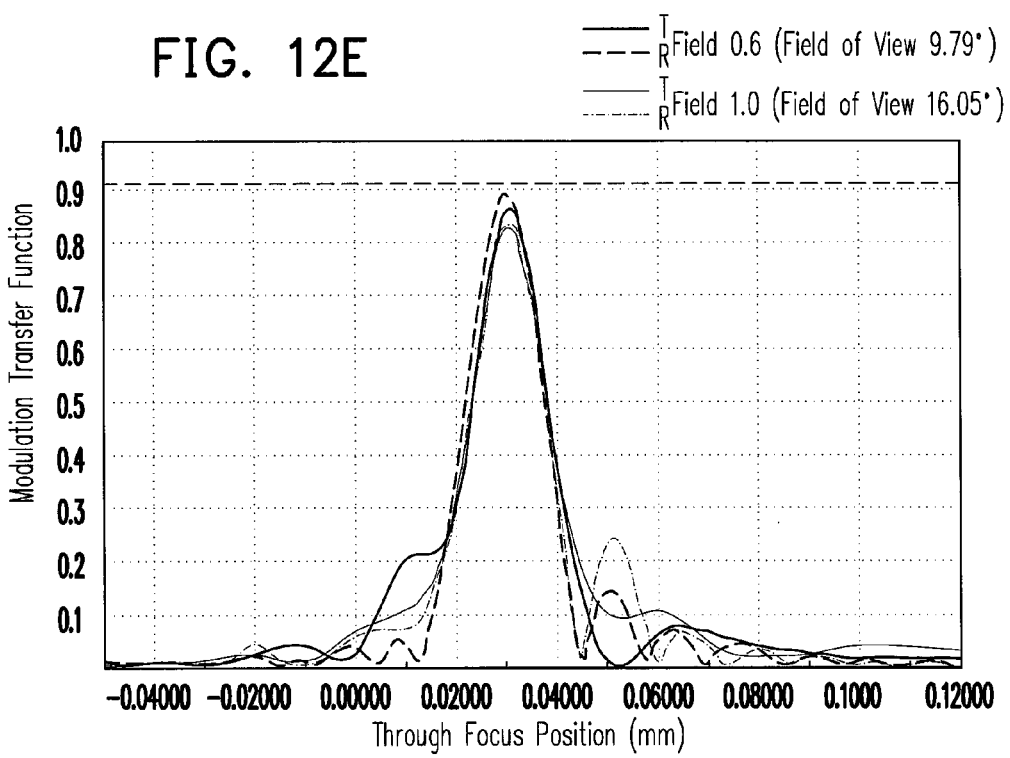
Figure 12G:
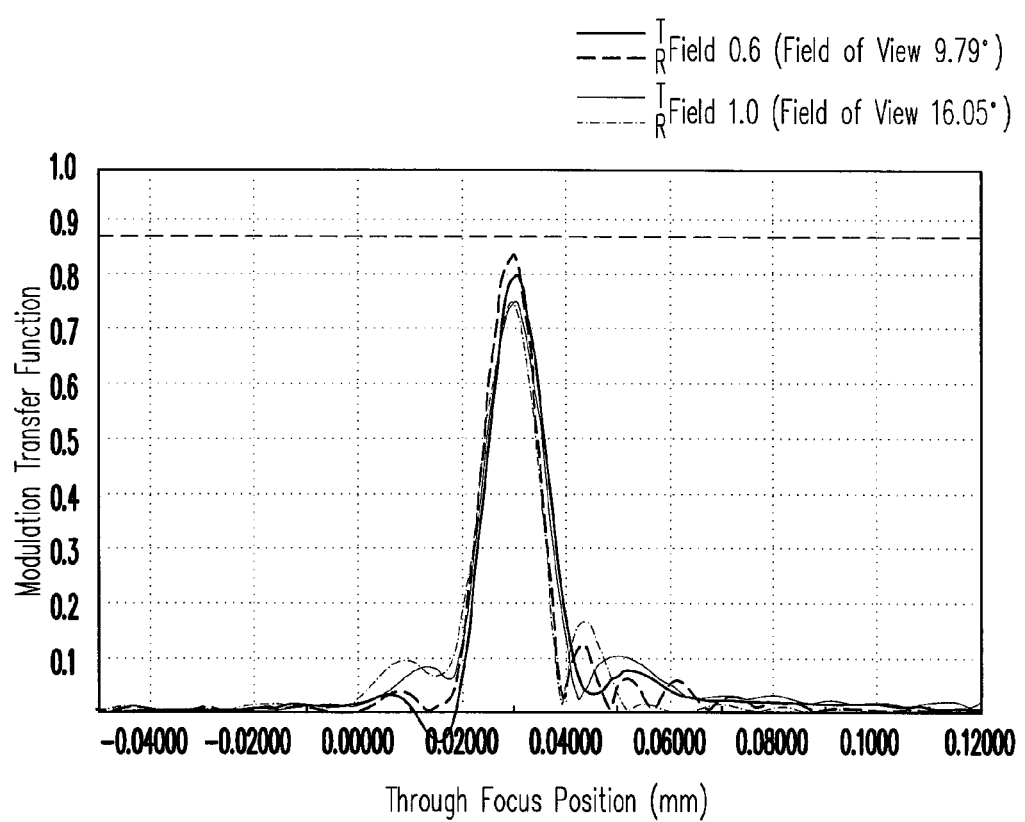

FIG. 11 is a diagram of an imaging lens according to another exemplary embodiment. FIG. 12A to FIG. 12G show curves that respectively illustrate the through focus MTFs of the imaging lens of FIG. 11 when the spatial frequencies are respectively 10 lp/mm, 20 lp/mm, 30 lp/mm, 40 lp/mm, 50 lp/mm, 100 lp/mm, and 200 lp/mm. Each figure from FIG. 12A to FIG. 12G illustrates the curves of through focus MTFs in a tangential direction and a sagittal direction and when the field is 0.6 (that is the angular view of field is 9.79 degree) and 1.0 (that is the angular view of field is 16.05 degree). The line at the left of English letter "T" represents a style of line in the figure and the curve with the same style is the curve of the through focus MTF in the tangential direction. The line at the left of English letter "R" represents another style of line in the figure and the curve with the same style is the curve of the through focus MTF in the sagittal direction. For example, the line at the left of "T" which is at the left of "field 0.6" in figures represent a style of line in the graph and the curve of the through focus MTF with the same style is in tangential direction when the field is 0.6. The line at the left of "R" which is at left of the "field 0.6" in figures represent a style of line in the figures and the curve of the through MTF with the same style are in the sagittal direction when the field is 0.6, and so on for the physical meanings of the style of line in the remaining curves.

In the embodiment of FIGS. 12A to 12G, the through focus distance represents the image distance in the image space corresponding to the object distance in the object space. Moreover, in this embodiment, the image parameters are MTFs in different spatial frequencies, and the image values are the through focus MTF values respectively corresponding to the MTFs in the different spatial frequencies.

Figure 13C:
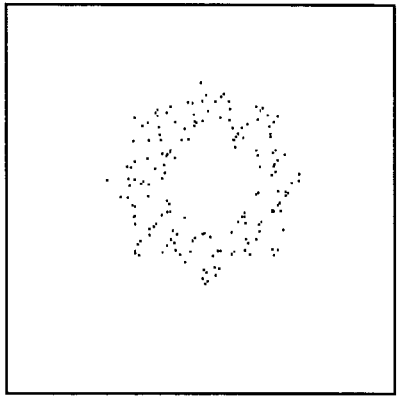
FIG. 13A to FIG. 13C are diagrams illustrating the energy distributions of the point spread functions of the imaging lens of FIG. 11 when the object distance is 34 cm, 33 cm, and 32 cm, respectively.
Figure 13B:
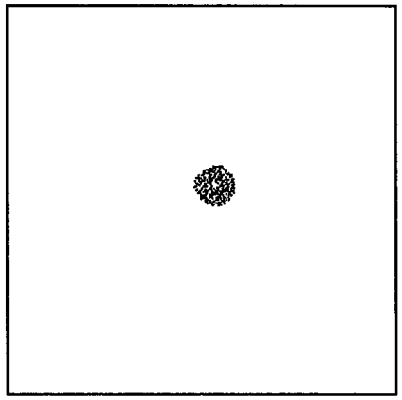
Figure 13A:
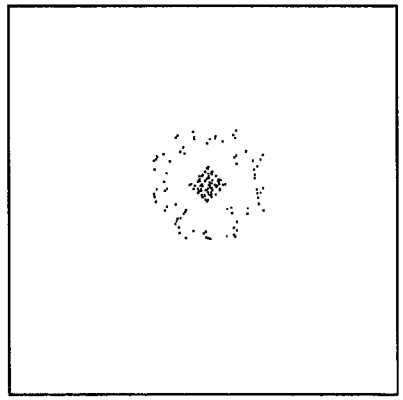
Figure 14:
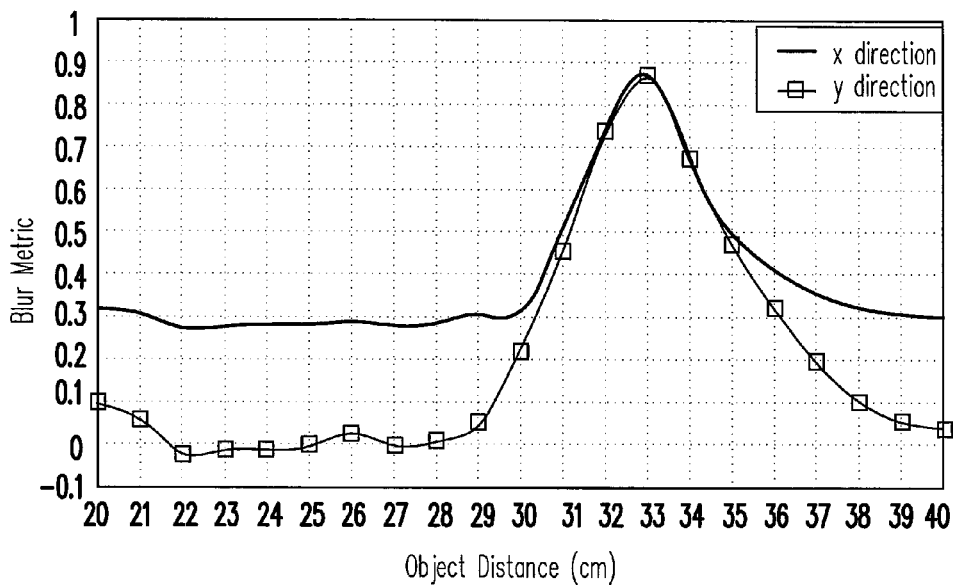
FIG. 14 illustrates the blur metrics in the x direction and the y direction of the imaging lens of FIG. 11 under a specific spatial frequency.

FIG. 13A to FIG. 13C are diagrams illustrating the energy distributions of the PSFs of the imaging lens of FIG. 11 when the object distance is 34 cm, 33 cm, and 32 cm, respectively. FIG. 14 illustrates the blur metrics in the x direction and the y direction of the imaging lens of FIG. 11 under a specific spatial frequency. First, referring to FIG. 11 and FIG. 13A to FIG. 13C, an imaging lens 300c of this embodiment can substitute the imaging lens 300 in FIG. 1A and FIG. 2 to apply in the ranging apparatus 200 and the interactive display system 100 in FIG. 1A. The change of the energy distribution of the PSF of the imaging lens 300 in this embodiment with the change of the object distance D is not substantially different in different directions (e.g. in the x direction and the y direction). In other words, the change of the SPF with the object distance D does substantially not have directional variations. It is known from FIG. 13A to FIG. 13C that when the object distance changes from 34 cm to 33 cm, the PSF becomes more concentrated in all directions simultaneously. However, when the object distance changes from 33 cm to 32 cm, the SPF becomes more scattered in all directions simultaneously. The Strehl ratio listed in FIG. 13A to FIG. 13C are related to the concentration degree of the PSF. When the Strehl ratio is greater, the PSF becomes more concentrated.

The imaging lens 300c of this embodiment includes a first lens 310c, a second lens 320c, a third lens 330c, a fourth lens 330c, and a fifth lens 350c which are arranged in sequence from the object side towards the image side. The refractive powers of the first lens 310c, the second lens 320c, the third lens 330c, the fourth lens 330c, and the fifth lens 350c are respectively positive, negative, positive, positive, and negative. In this embodiment, the first lens 310c may be a positive meniscus lens with a convex surface facing toward the object side, for example. The second lens 320c may be a negative meniscus lens with a convex surface facing toward the object side, for example. The third lens 330c may be a biconvex lens, for example. The fourth lens 340c may be a positive meniscus lens with a convex surface facing toward the object side, for example. The fifth lens 350c may be a biconcave lens, for example.

The following contents provide an example of the imaging lens 300c, but the embodiment of the disclosure is not limited thereto.

TABLE 4

| Surface | Radius of Curvature (mm) | Interval (mm) | Material | Remarks |
|---|---|---|---|---|
| S1c | 11.055 | 1.044 | Z-E48R | First lens |
| S2c | 27.362 | 0.592 | | |
| S3c | 4.568 | 1.029 | OKP4HT Z-E48R | Second lens |
| S4c | 3.337 | 2.155 | | |
| S5c | 13.556 | 3.487 | Z-E48R | Third lens |
| S6c | −9.152 | 0.100 | | |
| S7c | 6.217 | 2.960 | Z-E48R | Fourth lens |
| S8c | 7.250 | 2.735 | | |
| S9c | −77.492 | 1.530 | OKP4HT | Fifth lens |
| S10c | 9.107 | | | |

The description of each physical quantity in table 4 can be referred to the description for table 1. Furthermore, in table 4, the surfaces S1c and S2c are two surfaces of the first lens 310c, wherein the surface S1c is an aperture stop. The surfaces S3c and S4c are two surfaces of the second lens 320c. The surfaces S5c and S6c are two surfaces of the third lens 330c. The surfaces S7c and S8c are two surfaces of the fourth lens 340c. The surfaces S9c and S10c are two surfaces of the fifth lens 350c. Please refer table 4 for the related data of the radius of curvature, interval, and other parameters of each surface, which are not repeated herein.

In addition, the aforementioned surfaces S1c-S10c are aspheric surfaces, which can be represented by the aspheric formula of S1 and S3-S10. Referring to the description of the aforementioned S1 and S3-S10 aspheric formula for the description of each parameter in the formula, and the descriptions are not repeated herein. In this embodiment, the coefficient $A_1$ is 0. The aspheric parameters of the surfaces S1c-S10c are listed in table 5.

TABLE 5

| Aspheric Parameter | Conic Coefficient k | Coefficient $A_2$ | Coefficient $A_3$ | Coefficient $A_4$ | Coefficient $A_5$ |
|---|---|---|---|---|---|
| S1c | 0.000 | 1.109E−03 | 0.000E+00 | 0.000 | 0.000 |
| S2c | 33.169 | 1.843E−03 | −9.548E−06 | 0.000 | 0.000 |
| S3c | −1.079 | −1.939E−03 | 6.508E−07 | 0.000 | 0.000 |
| S4c | −0.755 | −3.967E−03 | 4.392E−06 | 0.000 | 0.000 |
| S5c | 2.483 | −1.173E−04 | −4.474E−05 | 0.000 | 0.000 |
| S6c | 1.640 | −8.772E−05 | −3.360E−06 | 0.000 | 0.000 |
| S7c | 0.720 | −4.163E−04 | 1.292E−05 | 0.000 | 0.000 |
| S8c | −2.224 | 4.961E−04 | 5.752E−05 | 0.000 | 0.000 |
| S9c | 0.000 | −9.212E−03 | 1.064E−04 | 0.000 | 0.000 |
| S10c | 4.505 | −8.220E−03 | 1.799E−04 | 0.000 | 0.000 |

TABLE 6

| Parameter | Specification |
|---|---|
| Image Height | 3 mm (1/3 inch, 2 megapixels) |
| Focal Length | 10 mm |

TABLE 6-continued

| Parameter | Specification |
|---|---|
| f-number | 1.2 |
| Angular Field of View | 32 degree |
| Object Distance | 300 mm |
| Relative Illumination | >50% |
| Optical Distortion | <2% |
| Chief Ray Angle (CRA) | Maximum CRA <28.6 degree |

The specification of the imaging lens 300c of an embodiment are listed in table 6, however, the embodiment of the disclosure is not limited thereto. Please refer to the descriptions of each parameter of table 3 for the description of each parameter in table 6.

Referring to FIG. 11 and FIG. 12A to FIG. 12G, it can be known from FIG. 12A to FIG. 12G that the image is sharper when the object 50 is located at an optimum object distance of the imaging lens 300c because there are more high frequency signals for the image of the object imaged by the imaging lens 300c. The image sharpness gradually reduces as the object distance D moves away from the optimum object distance of the imaging lens 300c. According to the above characteristic, the processor 220 may determine whether the object 50 is within the predetermined object distance range or calculate the object distance D of the object through analyzing the image parameters corresponding to the image in various spatial frequencies and comparing different changes of image parameters corresponding to a plurality of spatial frequencies or further comparing the different changes of the image parameters of lights of different colors, and then comparing the image parameters with the signal E. In this embodiment, the image parameters are MTFs in different spatial frequencies, and the image values are the through focus MTF values respectively corresponding to the MTFs in the different spatial frequencies. Moreover, in another embodiment, the image parameters may be image blur metrics in different spatial frequencies, and the image values may respectively correspond to the image blur metrics in the different spatial frequencies.

Besides, the image blur metric in the x direction and the image blur metric in the y direction can be obtained according to the images of the different spatial frequencies. As illustrated in FIG. 14, curves illustrate the changes of the image blur metric in the x direction and the image blur metric in the y direction with the change of the object distance D of a certain spatial frequency, and in this embodiment, the image parameters are image blur metrics in different directions (e.g. the x direction and the y direction). According to the relationship of comparing two curves of FIG. 14, and then comparing the above relationship with the signal E, the processor 220 is able to determine whether the object 50 is within the predetermined object distance range or calculate the object distance D of the object 50. The detail of determining whether the object 50 is within the predetermined object distance range or calculating the object distance D of the object 50 by utilizing two curves of FIG. 14 may utilize a method similar to other exemplary embodiments mentioned above. Hence, it is not repeated herein.

Figure 15:
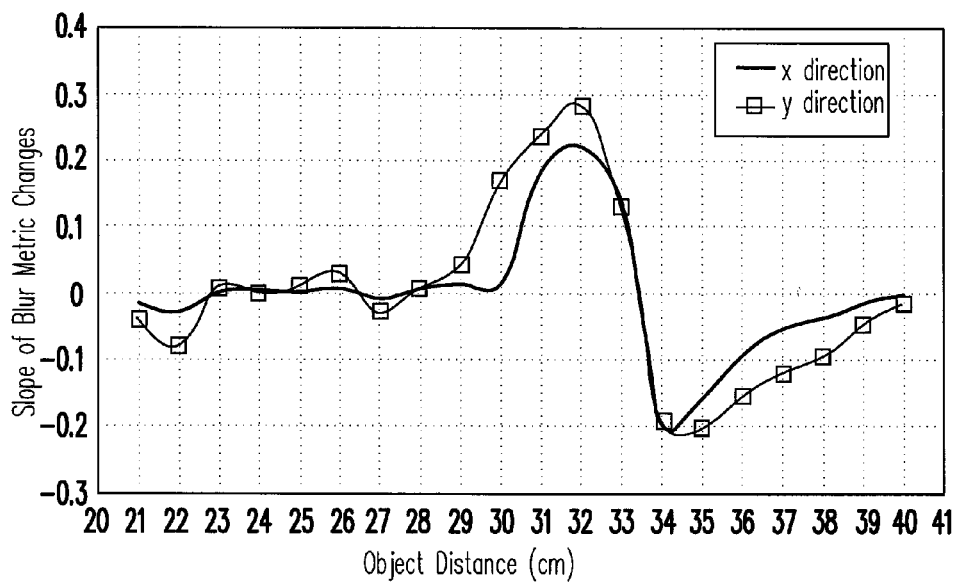
FIG. 15 shows curves illustrating the slope of the blur metric in the x direction and the slope of the blur metric in the y direction with respect to the object distance in a specific spatial frequency in FIG. 14.

FIG. 15 shows curves illustrating the slope of the blur metric in the x direction and the slope of the blur metric change in the y direction with respect to the object distance in the specific spatial frequency in FIG. 14. Referring to FIG. 11, FIG. 14, and FIG. 15, two curves in FIG. 15 may be viewed as derivative functions obtained by differentiating the two curves in FIG. 14 with respect to the object distance. When the obtained object distance values are not continuous, a vertical axis value corresponding to a certain object distance on the curve of FIG. 15 is a slope of a line which is drawn by connecting the point of the corresponding curve in FIG. 14 at the certain object distance to an adjacent point of the corresponding curve. In this embodiment, the processor 220 determines whether the object 50 is within the predetermined object distance range according to the different changes of the slopes of the image parameters with the change of the object distance D. In other words, as illustrated in FIG. 15, the slope of the blur metric in the x direction and the slope of the blur metric in the y direction change differently with the change of object distance D, which may thus be compared with the signal E by the processor 220, and the processor 220 can determine whether the object 50 is within the predetermined object distance range or calculate the object distance D of the object 50.

Figure 16:
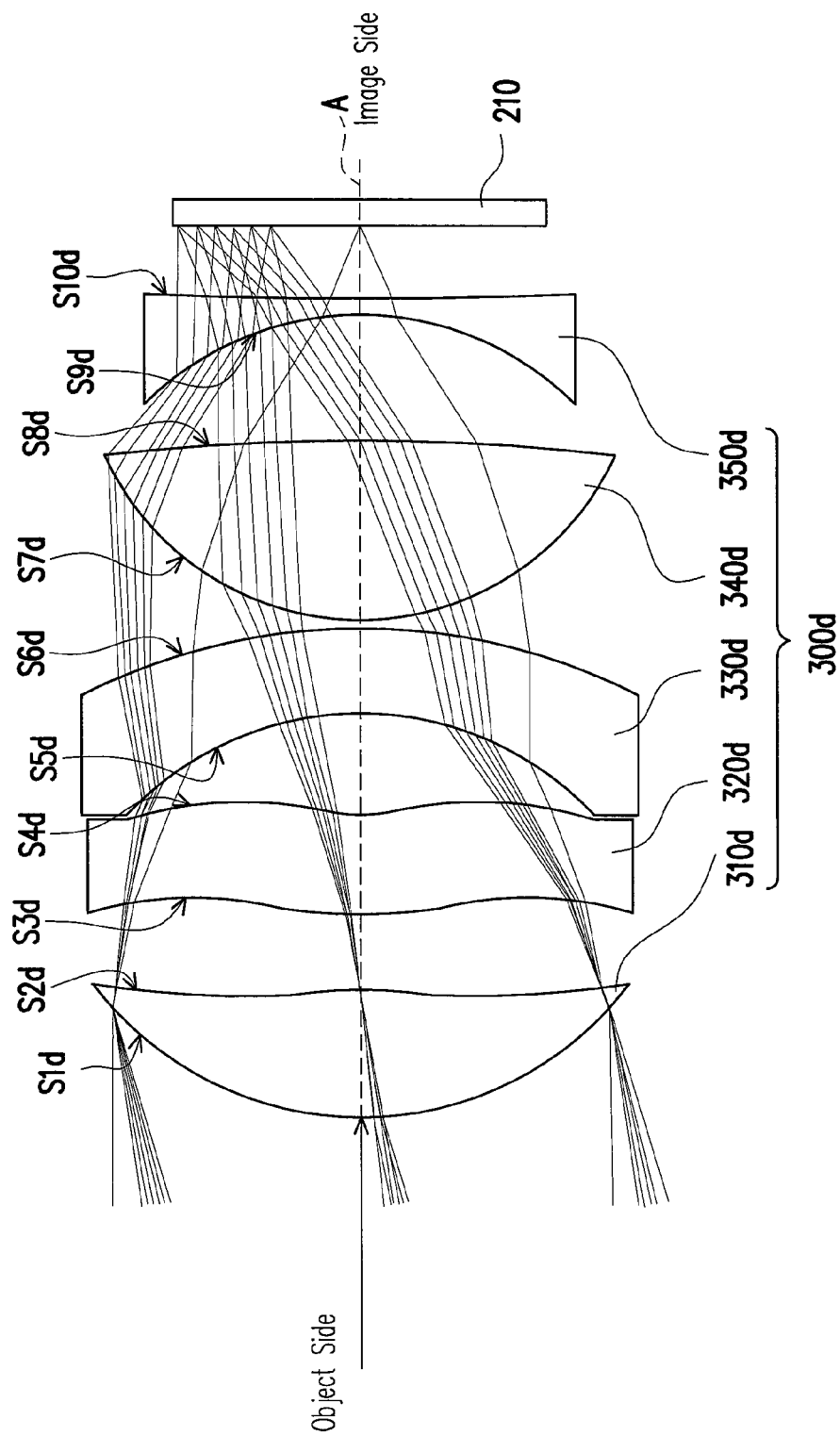
FIG. 16 is a diagram illustrating an imaging lens according to another exemplary embodiment.
Figure 17:
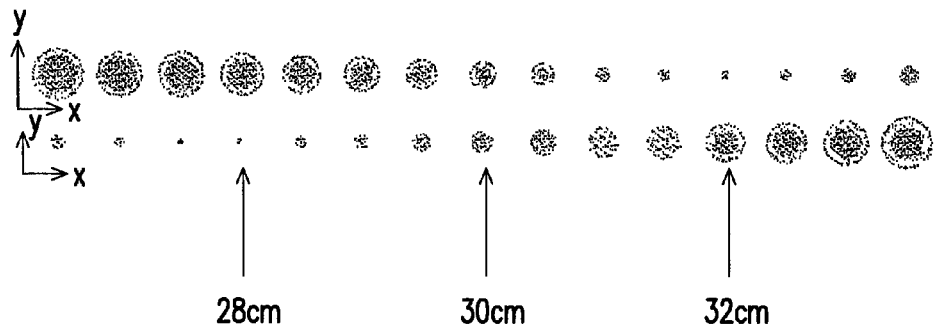
FIG. 17 is a diagram illustrating the energy distribution of the red light point spread function and the energy distribution of the green light point spread function of the imaging lens of FIG. 16.
Figure 18:
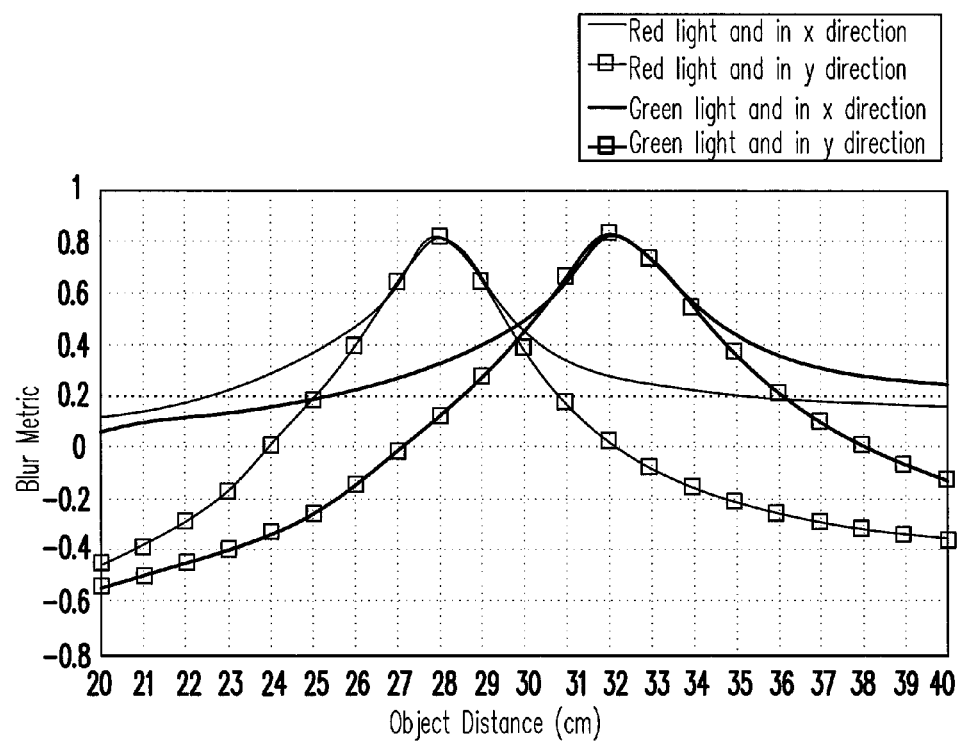
FIG. 18 shows curves illustrating the changes of the red light blur metric in the x direction, the red light blur metric in the y direction, the green light blur metric in the x direction, and the green light blur metric in the y direction, which are generated by the imaging lens of FIG. 16, with the change of the object distance.

FIG. 16 is a diagram illustrating an imaging lens according to another exemplary embodiment. FIG. 17 is a diagram illustrating the energy distribution of the PSF of red light and the energy distribution of the PSF of green light of the imaging lens in FIG. 16. FIG. 18 shows curves illustrating the changes of the red light blur metric in the x direction, the red light blur metric in the y direction, the green light blur metric in the x direction and the green light blur metric in the y direction, which are generated by the imaging lens of FIG. 16, with the change of the object distance. Referring to FIG. 16, FIG. 17, and FIG. 18, an imaging lens 300d of this embodiment can be utilized to substitute for the imaging lens 300 in FIG. 1A and FIG. 2, so as to be applied in the ranging apparatus 200 and the interactive display system 100 in the FIG. 1A. By comparing with the imaging lens 300c of FIG. 11, in addition to the change of blur metric at different object distances, the imaging lens 300d of this embodiment further enables the difference of the optimum image-forming object distances of lights of different colors (e.g. red light and green light) to be greater than the degree to be achieved for determining the distance. For example, the difference between the optimum image-forming object distances of red light and green light can be greater than 1 cm. Thereby, the accuracy for determining the distance of the object 50 by the processor 220 is improved.

The imaging lens 300d of this embodiment includes a first lens 310d, a second lens 320d, a third lens 330d, a fourth lens 340d, and a fifth lens 350d which are arranged in sequence from the object side towards the image side. The refractive powers of the first lens 310d, the second lens 320d, the third lens 330d, the fourth lens 340d, and the fifth lens 350d are respectively positive, negative, negative, positive, and negative. In this embodiment, the first lens 310d may be a biconvex lens, for example. The second lens 320d may be a negative meniscus lens with a convex surface facing toward the object side, for example. The third lens 330d may be a negative meniscus lens with a convex surface facing toward the image side, for example. The fourth lens 340d may be a biconvex lens, for example. The fifth lens 350d may be a biconcave lens, for example.

The following contents provide an example of the imaging lens 300d, but the embodiment of the disclosure is not limited thereto.

TABLE 7

| Surface | Radius of Curvature (mm) | Interval (mm) | Material | Remark |
|---|---|---|---|---|
| S1d | 6.200 | 1.996 | Z-E48R | First lens |
| S2d | -47.279 | 1.675 | | |
| S3d | 41.745 | 1.293 | Z-E48R | Second lens |
| S4d | 9.375 | 1.383 | | |
| S5d | -4.590 | 1.580 | OKP4HT | Third lens |
| S6d | -8.065 | 0.100 | | |
| S7d | 4.140 | 3.000 | Z-E48R | Fourth lens |
| S8d | -12.789 | 1.878 | | |
| S9d | -5.082 | 0.300 | OKP4HT | Fifth lens |
| S10d | 28.839 | | | |

The description of each physical quantity in table 7 can be referred to the descriptions in table 1. Furthermore, in table 7, the surfaces S1d and Std are two surfaces of the first lens 310d, wherein the surface S1d is the aperture stop. The surfaces S3d and S4d are two surfaces of the second lens 320d. The surfaces S5d and S6d are two surfaces of the third lens 330d, the surfaces S7d and S8d are two surfaces of the fourth lens 340d, and the surfaces S9d and S10d are two surfaces of the fifth lens 350d. Please refer to table 7 for the radius of curvature, interval, and other parameters of each surface, which are not repeated herein.

In addition, the aforementioned surfaces S1d-S10d are aspheric surfaces, which can be represented by the aspheric formula of the surfaces S1 and S3-S10. Referring to the description of the aforementioned S1 and S3-S10 aspheric formula for the description of each parameter in the formula, which are not repeated herein. In this embodiment, the coefficient $A_1$ is 0. The aspheric parameters of the surfaces S1d-S10d are listed in table 8.

TABLE 8

| Aspheric Parameter | Conic Coefficient k | Coefficient $A_2$ | Coefficient $A_3$ | Coefficient $A_4$ | Coefficient $A_5$ |
|---|---|---|---|---|---|
| S1d | 0.433 | -9.345E-05 | 1.786E-06 | 0.000 | 0.000 |
| S2d | 0.000 | 8.618E-04 | -1.014E-05 | 0.000 | 0.000 |
| S3d | 0.000 | -1.892E-03 | -1.227E-05 | 0.000 | 0.000 |
| S4d | 0.000 | -5.380E-03 | -2.427E-06 | 0.000 | 0.000 |
| S5d | -0.522 | 2.099E-03 | -1.292E-04 | 0.000 | 0.000 |
| S6d | -1.202 | 2.252E-03 | -6.328E-05 | 0.000 | 0.000 |
| S7d | -0.154 | -1.128E-03 | -7.639E-06 | 0.000 | 0.000 |
| S8d | 6.593 | 2.182E-03 | 1.524E-05 | 0.000 | 0.000 |
| S9d | 0.301 | -3.804E-03 | 3.718E-04 | 0.000 | 0.000 |
| S10d | 72.522 | -4.644E-03 | 2.676E-04 | 0.000 | 0.000 |

TABLE 9

| Parameter | Specification |
|---|---|
| Image Height | 3 mm (⅓ inch, 2 megapixels) |
| Focal Length | 9.46 mm |
| f-number | 1.2 |
| Angular Field of View | 34 degrees |
| Object Distance | 300 mm |
| Relative Illumination | >50% |
| Optical Distortion | <2% |
| Chief Ray Angle (CRA) | Maximum CRA <28.6 degrees |

The specification of the imaging lens 300d of an embodiment are listed in table 9, however, the embodiment of the disclosure is not limited thereto. Please refer to the descriptions of each parameter of table 3 for the descriptions of each parameter in table 9.

It can be learned from FIG. 17 that in addition to the concentrated or scattered change of the energy distribution with the change of the object distance D, the optimum object distances of lights of difference colors are also different. For example, the top row in FIG. 17 illustrates the energy distributions of the PSFs of the red light, and the bottom row illustrates the energy distributions of the PSFs of the green light. The optimum object distance of red light is 32 cm, and the optimum object distance of green light is 28 cm. Therefore, the processor 220 can determine whether the object distance of the object 50 is within the predetermined object distance range or calculate the object distance D of the object 50 according to the sharpness of the images of different colors or by further analyzing the image parameters (e.g. blur metric) corresponding to the different spatial frequencies in the image of lights of different colors. In detail, as illustrated in FIG. 18, the signal E can be compared with the relationship of four curves in FIG. 18 to determine whether the object distance D of the object 50 is within the predetermined object distance, or to calculate the object distance D of the object 50.

Figure 19:
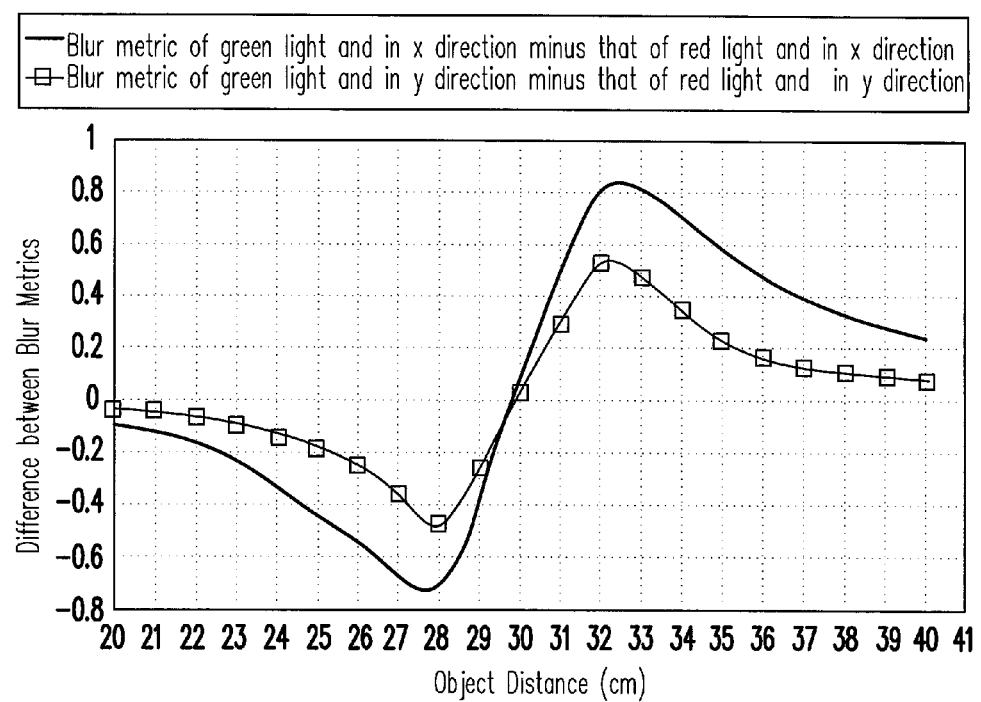
FIG. 19 is a graph illustrating the change of the difference of the green light blur metric in the x direction and the red light blur metric in the x direction and the difference of the green light blur metric in the y direction and the red light blur metric in the y direction with the object distance D.

FIG. 19 shows curves illustrating the changes of the difference between the green light blur metric in the x direction and the red light blur metric in the x direction and the difference between the green light blur metric in the y direction and the red light blur metric in the y direction with the change of the object distance D. Referring to FIG. 19, in another embodiment, the processor 220 can determine whether the object 50 is within the predetermined object distance range according to the changes of the differences between the image parameters at different object distances D with the change of the object distance D, wherein the differences may be the difference obtained by subtracting the red light blur metric in the x direction from the green light blur metric in the x direction (or the difference obtained by subtracting the green light blur metric in the x direction from the red light blur metric in the x direction in other embodiments) and the difference obtained by subtracting the red blur metric in the y direction from the green light blur metric in the y direction (or the difference obtained by subtracting the green blur metric in the y direction from the red light blur metric in the y direction in other embodiments). In this embodiment, whether the object 50 is within the predetermined object distance range can be determined by utilizing the changes of the two different differences mentioned above with the change of the object distance D, and the object distance D can be obtained. By comparing with the embodiment of FIG. 18, the threshold is not required to be chosen in the embodiment of FIG. 19 by utilizing the curve relationship of the embodiment in FIG. 19. Rather, the processor 220 determines whether to start to determine whether the object 50 is within the predetermined object distance range or to start to calculate the object distance D of the object 50 by determining the extreme values and the zero points of the differences.

In addition to determining whether the object 50 is within the predetermined object distance range or to calculate the object distance D of the object 50 by the image values obtained by the single shot as described in the aforementioned embodiment, the processor 220 can determine the object distance D of the object 50 by comparing the relative changes of the image values obtained at different time in other embodiments. As a result, the accuracy of determining the object distance D is improved. The processor 220 can also determine the object distance D of the object 50 by comparing the image values obtained at different time and the threshold obtained by the prior calibration of the corresponding image parameters.

In the aforementioned exemplary embodiment, the processor 220 may be a digital logic circuit or a processor loaded with the programs of software stored in computer readable media.

Figure 20:
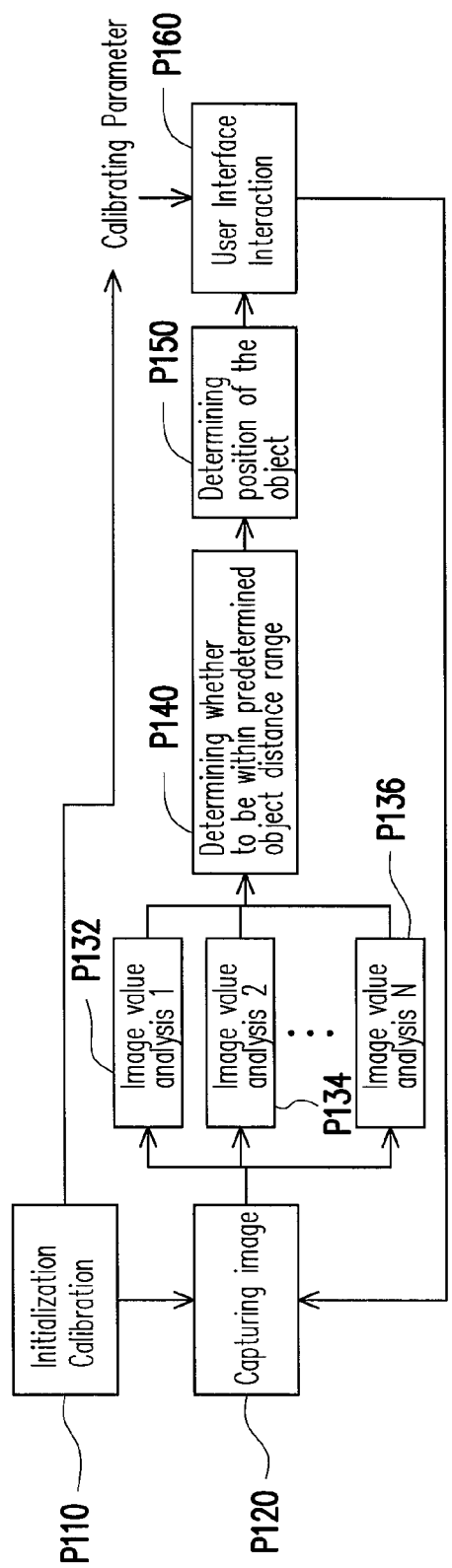
FIG. 20 illustrates a process flow of the processor of FIG. 1 according to an exemplary embodiment.

FIG. 20 illustrates the process flow of the processor of FIG. 1 according to an exemplary embodiment. Referring to FIG. 20, the process flow of the processor 220 may include the following steps. At first, the processor 220 may execute step P110, that is initializing calibration to obtain at least one of the various aforementioned curve relationships related to the image parameters, such as the relationship illustrated by at least one of FIG. 3B, FIG. 4, FIG. 9, FIG. 10, FIG. 14, FIG. 15, FIG. 18, and FIG. 19. Next, step P120 is executed, that is capturing images, i.e., capturing the signal E from the image sensor 210 to obtain image information. Then, steps P132, P124, and P 136 are executed, that is analyzing the image information obtained by step P120 to obtain the image values corresponding to the different image parameters (different image blur metrics as the aforementioned embodiment), wherein the number of the types of the image values may be N, for example, where N is a positive integer greater than or equal to 2. Afterward, step P140 is executed, that is determining whether the object 50 is within the predetermined object distance range through comparing the N types of image values obtained by steps P132, P134, and P136 with the relationship of the image parameters obtained by the initializing calibration of step P110. Then, step P150 is executed, that is determining the x coordinate and the y coordinate of the object 50 according to the image information captured in step P120. When the object 50 is a finger tip, the x coordinate and the y coordinate of the finger tip can be determined through analyzing the position of the area of the image having color of the skin. The step P160 is then executed, that is generating an interaction of a user interface. In detail, how to generate the interaction of the user interface can be determined according to the touch position of the finger tip determined during step P150, such as generating the point-and-select, drag, or other functions to the icon or item in the image. Furthermore, after the initializing calibration of step P110, users may calibrate parameters again according to the usage needs to improve the accuracy of user interface interaction. Furthermore, users can instruct the processor 220 to capture the image again according to the user interface interaction to determine the position and the object distance D of the object 50. In other embodiments, step P150 can be executed before step P140, e.g., step P150 can be executed between step P120 and steps p132, P134, and P136. At this time, step P150 can perform image splitting, and the image obtained from step P120 is further split to obtain the image of the object 50 (such as the finger tip), and the following steps P132, P134, and P 136 can analyze the image of the object 50 that was split to simplify the analysis of data or process.

Figure 21:
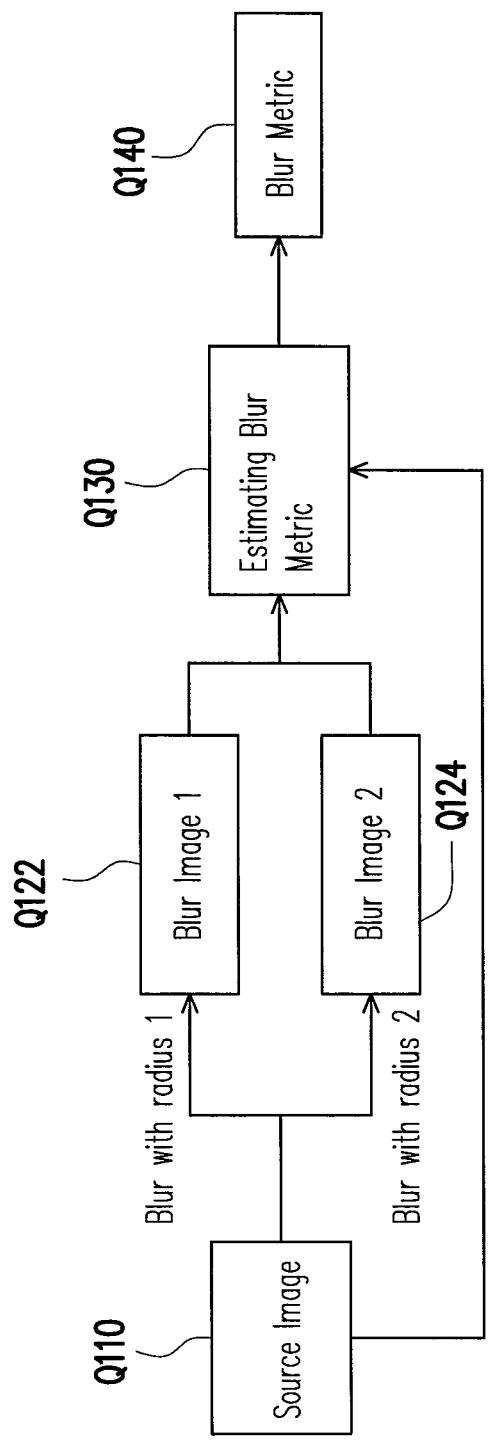
FIG. 21 illustrates a process flow of calculating the image blur metric by the processor according to an exemplary embodiment.

FIG. 21 illustrates a process flow of calculating the image blur metric by the processor according to an exemplary embodiment. Referring to FIG. 21, the calculation method of the blur metric of aforementioned embodiment can utilize any method from the cited periodic journals or documentations above, or utilizing other calculation method of the blur metric. One of the calculation methods of the blur metric is used as example here, but the embodiment of the disclosure is not limited thereto. A method in FIG. 21 is to view the image blur metric as the convolution of a clear image and the Gaussian function. The difference of before and after re-blur are compared through re-blurring a source image to calculate the blur metric. For example, as illustrated in FIG. 21, the process flow for calculating the blur metric includes the following steps. At first, as illustrated in step Q110, a source image is obtained from the image sensor 210; that is, the source image information is obtained from the signal E from the image sensor 210. Next, step Q122 and step Q124 are executed, wherein two different blur radii, i.e. blur radius 1 and blur radius 2, are utilized to perform a blurring process on the source image, and a blur image 1 and a blur image 2 are obtained respectively, wherein the blur radius is related to the width of the Gaussian function. In other words, the convolution operations are respectively performed on the source image with two Gaussian functions with different widths to obtain two different blur images. Afterward, step Q130 is executed, that is estimating the blur metric through the comparison of the blur image 1, blur image 2, and the source image. Next the blur metric is obtained in step Q140.

Figure 22:
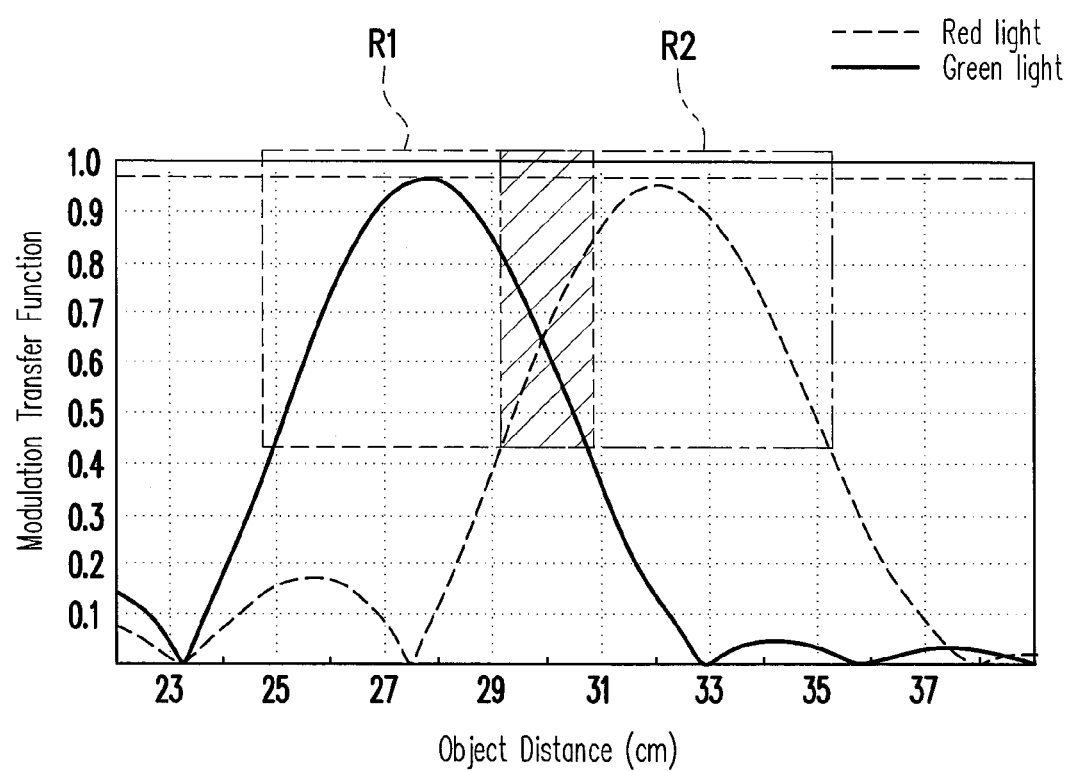
FIG. 22 shows curves illustrating modulation transfer functions of the imaging lens having chromatic aberration according to an exemplary embodiment.

When the calculation method of the blur metric is applied on the embodiment illustrated in FIG. 3A that generates astigmatism aberration, a kernel of re-blur can be divided into two type of blurs which are in the x axis and the y axis, and whether the object 50 is within the predetermined object distance range can be determined through comparing the blur metrics in the x axis and the y axis. Besides, when the calculation method of blur metric is applied on the embodiment as illustrated in FIG. 17 that generates chromatic aberration, the image can be divided into the image of a red channel and image of a green channel, and the blur metrics of two channels are calculated respectively. At this time, the distributions of the blur metrics with the object distance D appears as a double Gaussian distribution illustrated in FIG. 22. FIG. 22 shows curves illustrating the modulation transfer functions of the imaging lens having chromatic aberration according to an exemplary embodiment, which shows the MTFs of different wavelengths with respect to the change of the object distance (or the through focus distance in another embodiment) in a fixed spatial frequency. In this embodiment, the image parameters are MTFs of different wavelengths in the fixed spatial frequency. At this time, the pixel where the blur metric is greater than a certain threshold can be viewed as in an in-focus area, e.g., the area R1 is an in-focus area of green light, and the area R2 is an in-focus area of red light. An intersection area of the in-focus area of the green channel and the in-focus area of the red channel (that is the area filled with sloped lines) serves as a touch area (e.g. start to determine whether the object 50 is within the predetermined object distance range at this time or start to calculate the object distance D of the object 50 at this time) to improve the accuracy of determining the object distance D.

Figure 23:
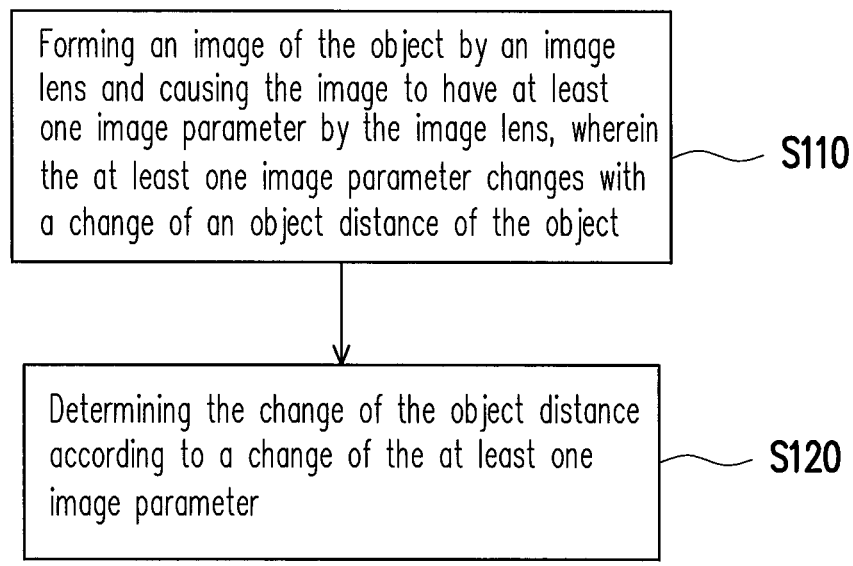
FIG. 23 is a flow chart of a ranging method according to an exemplary embodiment.

FIG. 23 is a flow chart of a ranging method according to an exemplary embodiment. Referring to FIG. 1A and FIG. 23, the ranging method of this embodiment can be applied to the ranging apparatus 200 of FIG. 1A or the ranging apparatus of other embodiments. The following utilizes the ranging apparatus in FIG. 1A as an example. The ranging method of this embodiment includes the following steps. At first, step S110 is executed, which is forming an image of the object 50 by an image lens 300 and causing the image to have at least one image parameter by the image lens 300, wherein the at least one image parameter changes with a change of an object distance D of the object 50. Refer to the embodiments described above for the detail of the image parameters of the image formed by the imaging lens 300, which is not repeated herein, and refer to the embodiments described above for the detail descriptions of the image formed onto the image sensor 210, which is not repeated herein. Next, step S120 is executed, which is determining the change of the object distance D according to a change of the at least one image parameter. Moreover, in this embodiment, whether the object 50 is within the predetermined object distance range is determined according to the image and the different changes of the image parameters with the change of the object distance. In this embodiment, the image formed is the image information included in the signal E in FIG. 1A. Furthermore, refer to the descriptions of the embodiments described above for the detail descriptions on the determination of whether the object 50 is within the predetermined object distance range and the calculation method of the object distance D, which is not repeated herein. In other words, step S120 can be executed by the processor 220. In addition, the ranging method of this embodiment can analyze images in order to respectively obtain the image values corresponding to the image parameters, wherein the analysis of the image may be the analysis of the signal E, for example. In addition, the ranging method of this embodiment can select an area of image to be analyzed corresponding to the object 50 from the image, such as selecting from the image information in the signal E.

In summary, in the ranging apparatus and ranging method in the embodiments of the disclosure, whether the object is within the predetermined object distance range is determined or the object distance of the object is calculated by utilizing the different changes of the image parameters with the change of object distance or by utilizing the change of at least one image parameter with the change of the object distance. Therefore, the accuracy of determination and calculation are improved and the rate of ranging is also improved. Thus, an effect of real-time ranging may be achieved. In addition, the interactive display system of the embodiment of the disclosure utilizes the above ranging apparatus. Therefore, users may interact with the display image that flows in the air, that is the effect of touching and controlling the display image that flows in the air can be simulated for users.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. An interactive display system, comprising: an image provider, providing a display image; and a ranging apparatus, comprising: an image sensor; an imaging lens, configured to image an object on the image sensor to produce an image of the object having a plurality of image parameters onto the image sensor, wherein the image parameters change differently with change of an object distance of the object, and the image sensor converts the image of the object into a signal, wherein the imaging lens has at least one non-axisymmetric lens, the non-axisymmetric lens has at least one non-axisymmetric curved surface, and a profile of the at least one non-axisymmetric curved surface in two different directions is not the same; and a processor, configured to determine whether the object is within a predetermined object distance range according to the signal and different changes of the image parameters with the change of the object distance; wherein the processor determines the change of the object distance according to different change of image parameters in different directions, wherein the image parameters comprise a plurality of image blur metrics in different directions, a modulation transfer function, a concentration of energy distribution of point spread function, or a combination thereof, wherein the image blur metrics in different directions are caused to change differently with change of the object distance; wherein a ratio of axial chromatic aberration of the imaging lens to a focal length of the imaging lens falls within a range of 0.0010 to 0.0100 or a range of −0.0010 to −0.0100, when the axial chromatic aberration being measured is of a 640 nm red light and a 550 nm green light corresponding to the image parameters, and wherein when the processor determines that the object is within the predetermined object distance range, the processor determines that the object touches the display image.

2. The interactive display system as claimed in claim 1, wherein the display image is a real image.

3. The interactive display system as claimed in claim 1, wherein the display image is a virtual image.

4. The interactive display system as claimed in claim 1, wherein the image provider and the ranging apparatus are located at two opposing sides of the display image.

5. The interactive display system as claimed in claim 1, wherein the image provider and the ranging apparatus are located at a same side of the display image.

6. A ranging apparatus, comprising: an image sensor; an imaging lens, configured to image an object on the image sensor to produce an image signal having a plurality of image parameters, wherein the image parameters change with a change of an object distance of the object, the imaging lens has at least one non-axisymmetric lens, the at least one non-axisymmetric lens has at least one non-axisymmetric curved surface, and the profile of the at least one non-axisymmetric curved surface in two different directions is not the same; and a processor, configured to determine the change of the object distance according to different changes of the image parameters in different directions, wherein the image parameters comprise a plurality of image blur metrics in different directions, a modulation transfer function, a concentration of energy distribution of point spread function, or a combination thereof, wherein the image blur metrics in different directions are caused to change differently with change of the object distance; and wherein a ratio of axial chromatic aberration of the imaging lens to a focal length of the imaging lens falls within a range of 0.0010 to 0.0100 or a range of −0.0010 to −0.0100, when the axial chromatic aberration being measured is of a 640 nm red light and a 550 nm green light corresponding to the image parameters.

7. The ranging apparatus as claimed in claim 6, wherein the different directions comprise two different directions substantially perpendicular to each other.

8. The ranging apparatus as claimed in claim 6, wherein the at least one image parameter comprises a plurality of image parameters comprising image blur metrics of a plurality of lights of different colors.

9. The ranging apparatus as claimed in claim 6, wherein the at least one image parameter comprises a plurality of image parameters comprising image blur metrics of a plurality of different spatial frequencies.

10. The ranging apparatus as claimed in claim 6, wherein the at least one image parameter comprises a plurality of image parameters, and the processor determines whether the object is within a predetermined object distance range according to the image signal and different changes of the image parameters with the change of the object distance.

11. The ranging apparatus as claimed in claim 10, wherein the processor further determines whether the object is within the predetermined object distance range according to change of a difference between the image parameters with the object distance.

12. The ranging apparatus as claimed in claim 10, wherein the image parameters respectively have slopes with respect to the object distance, and the processor further determines whether the object is within the predetermined object distance range according to different changes of the slopes with the change of the object distance.

13. The ranging apparatus as claimed in claim 6, wherein concentration of energy distributions of point spread functions of the imaging lens in two different directions reaches extreme values at different object distances.

14. The ranging apparatus as claimed in claim 13, wherein the two different directions are substantially perpendicular to each other.

15. The ranging apparatus as claimed in claim 6, wherein energy distributions of point spread functions of a plurality of lights of different colors of the imaging lens change differently with the change of the object distance.

16. The ranging apparatus as claimed in claim 6, wherein, according to a threshold of the at least one image parameter obtained in a prior calibration, the processor determines whether the processor is to start to determine the object distance according to the image signal.

17. The ranging apparatus as claimed in claim 16, wherein the processor further determines the object distance of the object according to an extreme value of the at least one image parameter with respect to the change of the object distance.

18. The ranging apparatus as claimed in claim 6, wherein the processor further determines the object distance of the object according to an extreme value of the at least one image parameter with respect to the change of the object distance.

19. The ranging apparatus as claimed in claim 6, wherein the processor processes the image signal to obtain at least one image value which corresponds to the at least one image parameter, and the processor determines the object distance of the object by comparing relative change of the at least one image value obtained at different time.

20. The ranging apparatus as claimed in claim 6, wherein the processor processes the image signal to obtain at least one image value which corresponds to the at least one image parameter, and the processor determines the object distance of the object by comparing the at least one image value obtained at different time with a threshold of the at least one image parameter obtained at a prior calibration.

21. The ranging apparatus as claimed in claim 6, wherein the processor determines the object distance of the object according to the image signal obtained by the image sensor at a single shot.

22. The ranging apparatus as claimed in claim 6, wherein the processor comprises:
   a position determining sub-unit, determining a position of the object in directions perpendicular to the object distance according to the image signal;
   an image splitting sub-unit, selecting an area of the image to be analyzed which corresponds to the object from the image;
   an image calculating sub-unit, calculating at least one image value which corresponds to the at least one image parameter according to the selected image to be analyzed; and
   a distance determining sub-unit, determining the object distance of the object according to the calculated image value.

23. A ranging method, comprising: forming an image of an object by an image lens; the image having a plurality of image parameters by the image lens, wherein the image parameters change with a change of an object distance of the object; and determining the change of the object distance according to different changes of the image parameters in different directions, wherein the image parameters comprise a plurality of image blur metrics in different directions, a modulation transfer function, a concentration of energy distribution of a point spread function, or a combination thereof, the image blur metrics in different directions changing differently with the change of the object distance; and wherein a ratio of axial chromatic aberration of the imaging lens to a focal length of the imaging lens falls within a range of 0.0010 to 0.0100 or a range of −0.0010 to −0.0100, when the axial chromatic aberration being measured is of a 640 nm red light and a 550 nm green light corresponding to the image parameters.

24. The ranging method as claimed in claim 23, wherein the different directions comprises two different directions substantially perpendicular to each other.

25. The ranging method as claimed in claim 23, wherein the at least one image parameter comprises a plurality of image parameters comprising image blur metrics of a plurality of lights of different colors.

26. The ranging method as claimed in claim 23, wherein the at least one image parameter comprises a plurality of image parameters comprising image blur metrics of a plurality of different spatial frequencies.

27. The ranging method as claimed in claim 23, wherein the at least one image parameter comprises a plurality of image parameters, and the ranging method further comprising:
   determining whether the object is within a predetermined object distance range according to the image signal and different changes of the image parameters with the change of the object distance.

28. The ranging method as claimed in claim 27, wherein determining whether the object is within the predetermined object distance range comprises:
   determining whether the object is within the predetermined object distance range according to change of a difference between the image parameters with the object distance.

29. The ranging method as claimed in claim 27, wherein the image parameters respectively have slopes with respect to the object distance, and determining whether the object is within the predetermined object distance range comprises:
   determining whether the object is within the predetermined object distance according to different changes of the slopes with the change of the object distance.

30. The ranging method as claimed in claim 23, wherein causing the image to have the at least one image parameter by the image lens comprises causing concentration of energy distributions of point spread functions of the imaging lens in two different directions to reach extreme values at the different object distances.

31. The ranging method as claimed in claim 30, wherein the two different directions are substantially perpendicular to each other.

32. The ranging method as claimed in claim 23, wherein causing the image to have the at least one image parameter by the image lens comprises:
   causing energy distributions of the point spread functions of a plurality of lights of different colors of the imaging lens to change differently with the change of the object distance.

33. The ranging method as claimed in claim 23, wherein determining the change of the object distance according to a change of the at least one image parameter comprises:
   according to a threshold of the at least one image parameter obtained by a prior calibration, determining whether to start to determine the object distance according to the image.

34. The ranging method as claimed in claim 33, further comprising:
   determining the object distance of the object according to an extreme value of the at least one image parameter with respect to the change of the object distance.

35. The ranging method as claimed in claim 23, further comprising:
   determining the object distance of the object according to an extreme value of the at least one image parameter with respect to the change of the object distance.

36. The ranging method as claimed in claim 23, further comprising:
   analyzing the image to obtain at least one image value which corresponds to the at least one image parameter; and
   determining the object distance of the object by comparing relative change of the at least one image value obtained at different time.

37. The ranging method as claimed in claim 23, further comprising:
   analyzing the image to obtain at least one image value that corresponds to the at least one image parameter; and
   determining the object distance of the object by comparing the at least one image value obtained at different time with a threshold of the at least one image parameter obtained from a prior calibration.

38. The ranging method as claimed in claim 23, further comprising:
   determining the object distance of the object according to a single image obtained from a single image formation for the object by the imaging lens.

39. The ranging method as claimed in claim 23, further comprising:
   determining a position of the object in directions perpendicular to the object distance according to the image;
   selecting an area of the image to be analyzed corresponding to the object from the image;
   calculating at least one image value corresponding to the at least one image parameter according to the selected image to be analyzed; and
   determining the object distance of the object according to the calculated image value.

* * * * *